United States Patent
Kerhuel et al.

(10) Patent No.: US 9,074,872 B2
(45) Date of Patent: Jul. 7, 2015

(54) METHOD AND DEVICE FOR MEASURING THE ANGULAR POSITION OF A RECTILINEAR CONTRASTING EDGE OF AN OBJECT, AND SYSTEM FOR FIXATION AND TRACKING A TARGET COMPRISING AT LEAST ONE SUCH CONTRASTING EDGE

(75) Inventors: Lubin Kerhuel, Le Celle Saint Cloud (FR); Nicolas Franceschini, Marseilles (FR); Stephane Viollet, Marseilles (FR)

(73) Assignees: UNIVERSITE D'AIX-MARSEILLE, Marseilles (FR); CENTRE NATIONAL DE LA RECHERCHE SCIENTIFIQUE (C.N.R.S.), Paris (FR)

( * ) Notice: Subject to any disclaimer, the term of this patent is extended or adjusted under 35 U.S.C. 154(b) by 349 days.

(21) Appl. No.: 13/516,654

(22) PCT Filed: Dec. 9, 2010

(86) PCT No.: PCT/EP2010/069272
§ 371 (c)(1),
(2), (4) Date: Aug. 22, 2012

(87) PCT Pub. No.: WO2011/073079
PCT Pub. Date: Jun. 23, 2011

(65) Prior Publication Data
US 2012/0305697 A1 Dec. 6, 2012

(30) Foreign Application Priority Data

Dec. 15, 2009 (EP) ..................... 09306239

(51) Int. Cl.
*G01B 11/26* (2006.01)
*F41G 7/20* (2006.01)
*G01B 11/02* (2006.01)
*G01B 11/00* (2006.01)
*F41G 7/00* (2006.01)

(52) U.S. Cl.
CPC ............ *G01B 11/028* (2013.01); *F41G 7/20* (2013.01)

(58) Field of Classification Search
CPC ........ G01B 11/02; G01B 11/028; F41G 7/20; F41G 7/22; F41G 7/2246; F41G 7/2253
USPC ......... 356/3, 3.13, 3.14, 3.15, 3.16, 138–153, 356/450, 459, 472–476, 614–640; 244/3.1–3.19; 382/100, 153; 700/245, 700/258, 259; 901/1, 46, 47, 50
See application file for complete search history.

(56) References Cited

U.S. PATENT DOCUMENTS 4,135,815 A * 1/1979 Masunaga et al. ........... 356/3.15
4,443,103 A * 4/1984 Erdmann et al. ............. 356/151

(Continued)

OTHER PUBLICATIONS

PCT/EP2010/069272 International Search Report dated Feb. 8, 2011.

*Primary Examiner* — Bernarr Gregory
(74) *Attorney, Agent, or Firm* — McDermott & Will Emery LLP

(57) ABSTRACT

The present invention relates to a method for measuring the angular position of a contrasting edge of an object having a luminance transition zone which is substantially rectilinear in a given direction and separates two regions of different luminances. This method comprises the functional steps of: —carrying out, in a transverse direction different from the given direction, an amplitude modulation of the signals delivered by a first and a second optical sensor; and —calculating an output signal (Yout(t)) starting from the signals delivered by the first and the second optical sensors (D1, D2) as a function of the angular position of the luminance transition zone. Device and set of devices for measuring the angular position of a contrasting edge and steering aid system for fixation and tracking a target comprising at least one such contrasting edge.

20 Claims, 18 Drawing Sheets

(56) References Cited

U.S. PATENT DOCUMENTS

| | | | |
|---|---|---|---|
| 4,686,683 A * | 8/1987 | Martin | 356/459 |
| 4,818,101 A * | 4/1989 | Soreide et al. | 356/141.3 |
| 4,827,436 A * | 5/1989 | Sabersky et al. | 356/621 |
| 5,026,153 A * | 6/1991 | Suzuki et al. | 356/3.16 |
| 6,705,566 B1 * | 3/2004 | Trice et al. | 244/3.16 |
| 7,667,859 B2 * | 2/2010 | Franceschini et al. | 356/629 |

* cited by examiner

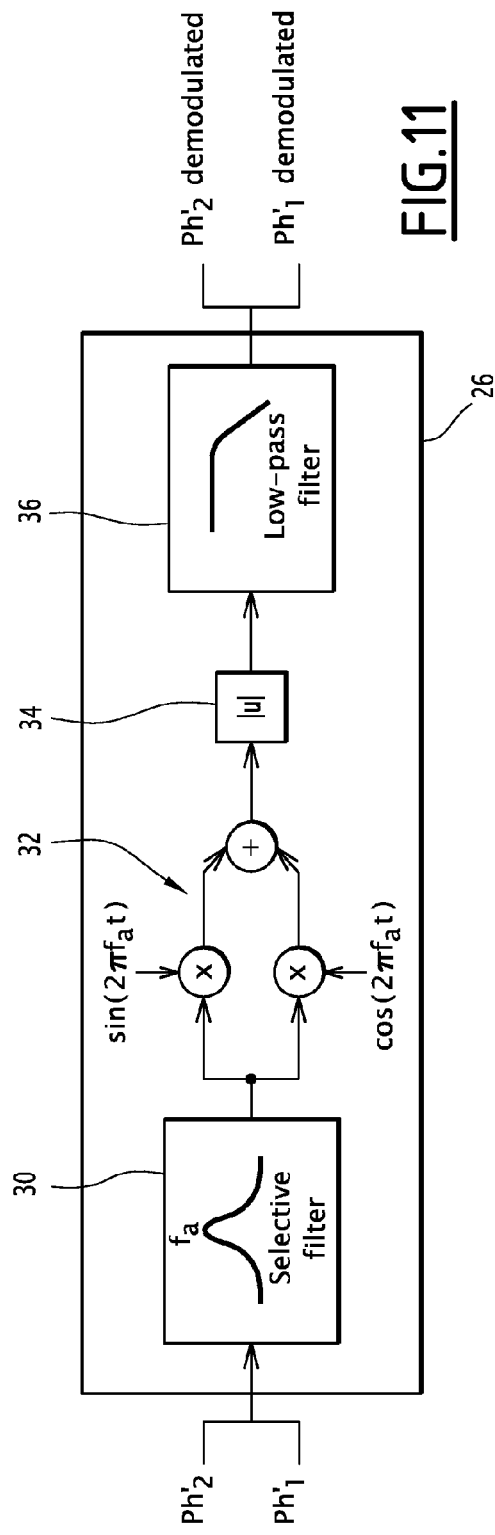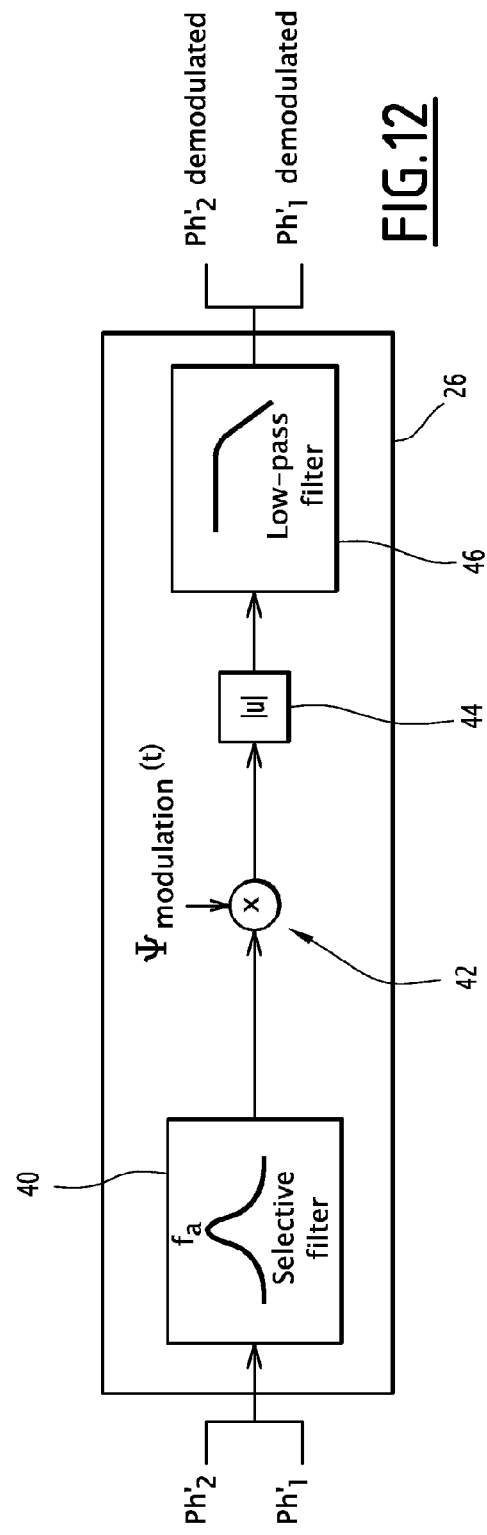

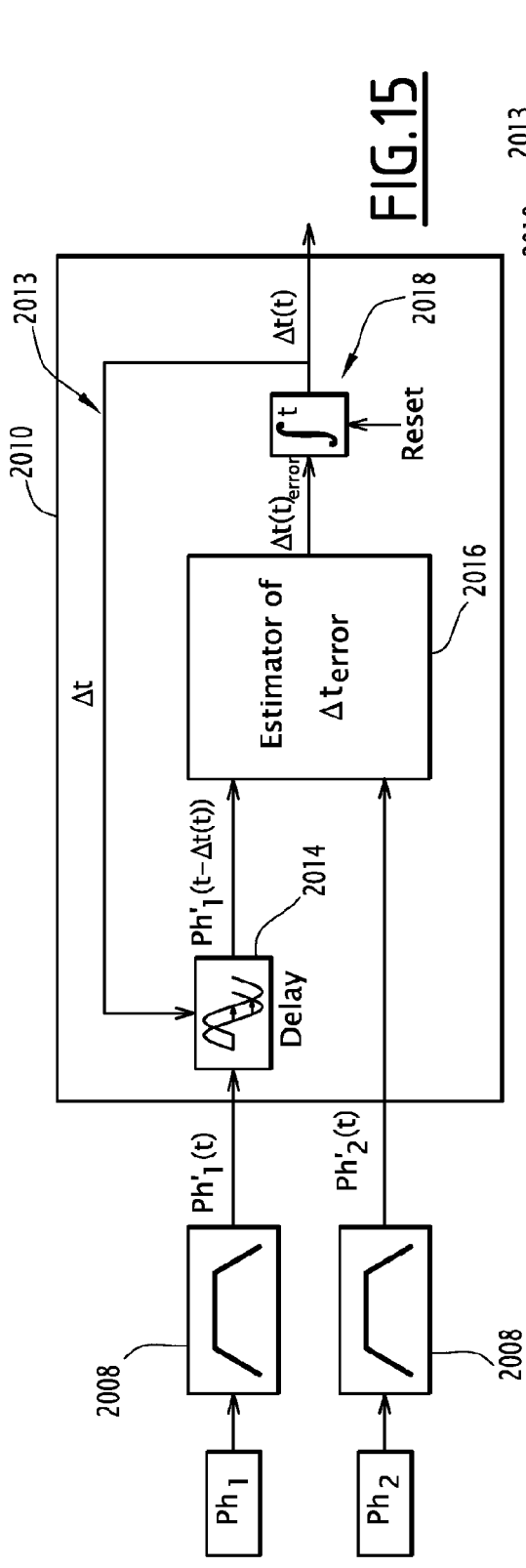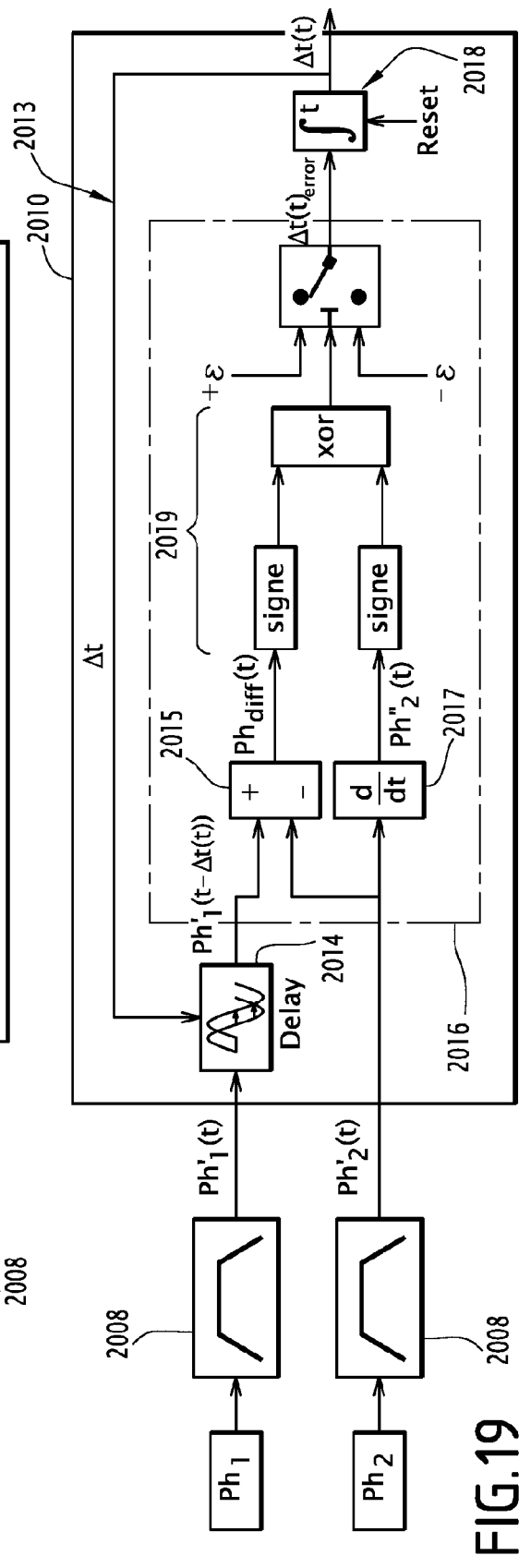

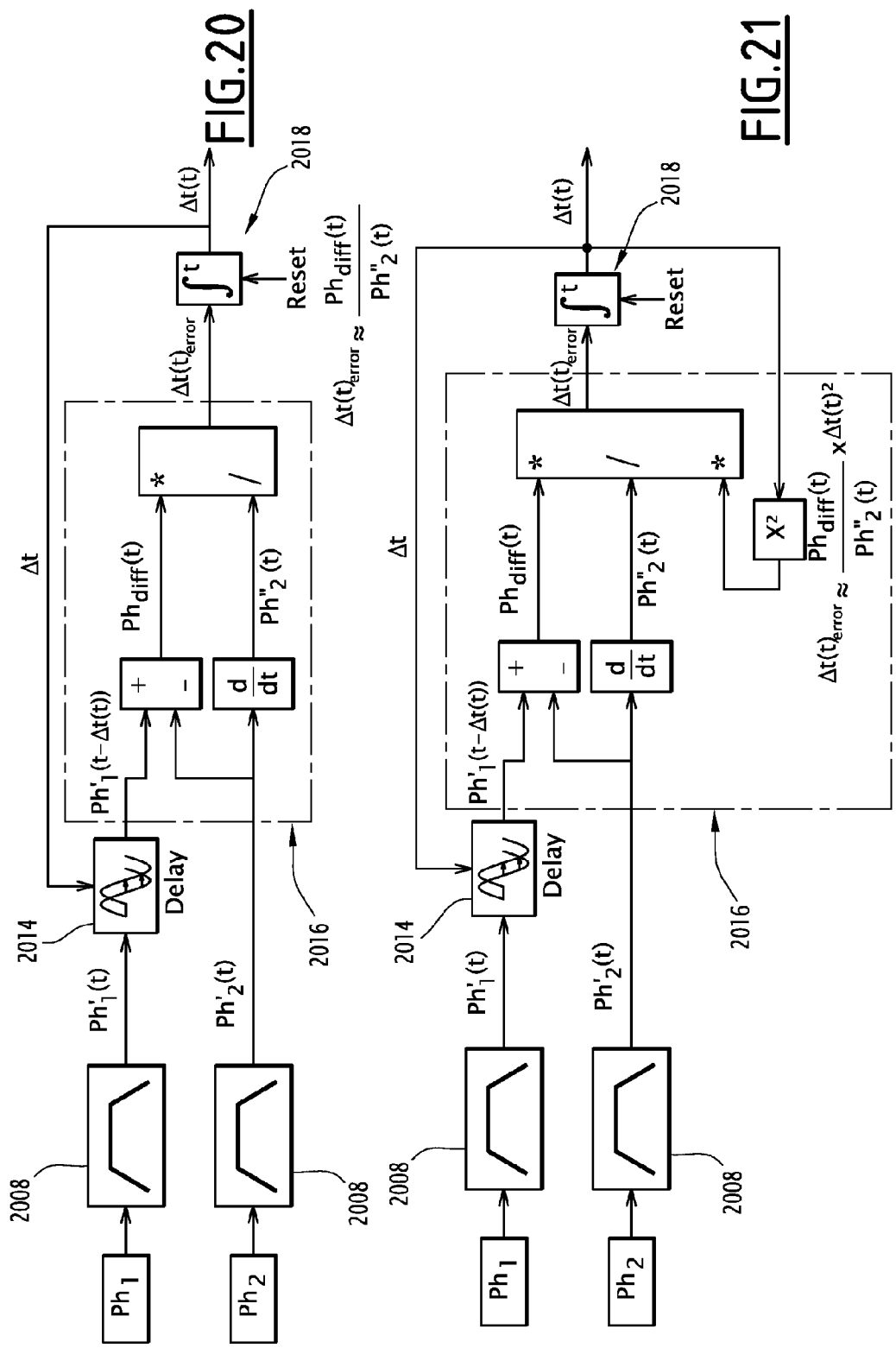

METHOD AND DEVICE FOR MEASURING THE ANGULAR POSITION OF A RECTILINEAR CONTRASTING EDGE OF AN OBJECT, AND SYSTEM FOR FIXATION AND TRACKING A TARGET COMPRISING AT LEAST ONE SUCH CONTRASTING EDGE

CROSS-REFERENCE TO RELATED APPLICATIONS

This application is the U.S. National Phase under 35 U.S.C. §371 of International Application No. PCT/EP2010/069272 filed on Dec. 9, 2010, which in turn claims the benefit of European Application No. 09306239.6, filed on Dec. 15, 2009, the disclosures of which Applications are incorporated by reference herein.

BACKGROUND OF THE INVENTION

The present invention relates to a method and a device for measuring the angular position of a substantially rectilinear contrasting edge of an object and to a system for fixing and tracking a target comprising at least one such contrasting edge. For example, the object is a picture or a landscape having a contrasting edge.

In particular, such systems for acquiring and tracking a target are used in microrobotics for the development of automatic flight control systems. For example, OSCAR (for Optical Scanning sensor for the Control of Autonomous Robots) gives a tethered aerial robot (the OSCAR Robot) the ability to fixate and track a target with a high level of accuracy, as described by S. Viollet and N. Franceschini in the article "Super-accurate Visual Control of an Aerial Minirobot", a part of the Conference on Autonomous Minirobots for Research and Edutainment, AMIRE, Paderborn, Germany, 2001, pp. 215-224, ISBN 3-935433-06-9. The published article is designated $A_1$.

Such method, device and system are described in patent document FR 2 869 494 (PCT: WO 2005/111536 A1). In particular, patent document FR 2 869 494 describes a method for detecting a contrasting edge having a luminance transition zone which is substantially rectilinear in a given direction and separating two regions of different luminances. This method is based on two optical sensors mounted behind a lens, their optical axes being separated by a small angle $\Delta\phi$, the "angular pitch", which is also called the inter-receptor angle.

This method consists in:
carrying out, in another direction transverse to this given direction, periodic positional scanning of the inter-receptor angle $\Delta\phi$ defined by a first and a second optical sensor, and
measuring the time difference between the signals delivered by the first and the second optical sensors, this time difference depending on both the vibrational law and the angular position of the contrasting edge relative to a reference direction lying within the inter-receptor angle $\Delta\phi$, this reference direction corresponding to a specific value of the time difference.

The periodic positional scanning is carried out, for example, by relative translation of the assembly formed by the two optical sensors in another direction, transverse to the given direction. But in FR 2869494 the vibrational law must be periodic and non-uniform for at least a portion of each period. Thus, the measurement of the time difference strongly depends on the vibrational law whose conformity has to be reproducible from one period to another.

BRIEF SUMMARY OF THE INVENTION

The aim of the invention is to simplify the overall system. The signal processing according to the present invention allows for an increased precision in angular localization, while using a vibrational law that can be random and of very small amplitude. Scanning can therefore be achieved by using angular vibrations intrinsic to the machine or vehicle onto which the device is mounted, eliminating the need for an additional scanning actuator. Alternatively, scanning can simply result from the translational vibration of the luminance transition zone itself in front of the stationary device.

Therefore, the invention relates to a method for measuring the angular position of a contrasting edge of an object having a luminance transition zone which is substantially rectilinear in a given direction and separates two regions of different luminances, characterized in that it comprises at least the functional steps of:
carrying out, in a transverse direction different from the given direction, an amplitude modulation of the signals delivered by a first and a second optical sensor, by angular vibration of the optical axes ($O_1Y_1$ and $O_2Y_2$) of the first and second optical sensors, according to a given vibrational law, the vibration of the optical axes ($O_1Y_1$, $O_2Y_2$) of the first and second optical sensors causing a vibration of the inter-receptor angle ($\Delta\phi$) of the first and second optical sensors, the inter-receptor angle ($\Delta\phi$) being delimited by the optical axes of the first and second optical sensors and containing the object with the luminance transition zone;
calculating an output signal ($Y_{out}(t)$) starting from the signals delivered by the first and the second optical sensors as a function of the angular position ($\Psi_C$) of the luminance transition zone, the output signal being independent of the vibrational law, and dependent on the angular position of the luminance transition zone relative to the mean optical axis of the device.

In other embodiments, the method for measuring the angular position comprises one or several of the following features, taken in isolation or in any technically feasible combination:
the output signal ($Y_{out}(t)$) is the difference-to-sum ratio of the amplitudes of the temporally filtered signals delivered by the first and the second optical sensors;
the given direction and the transverse direction are orthogonal;
the functional step of amplitude modulation consists in subjecting a lens having an optical center and being located between the stationary optical sensors and the luminance transition zone, or a group G formed by the first and second optical sensors placed substantially in the image focal plane of the stationary lens to relative translational vibrations with respect to the luminance transition zone in said transverse direction;
the functional step of amplitude modulation consists in subjecting a group G' formed by the first optical sensor, the second optical sensor and the lens to relative rotation around an axis parallel to the given direction with respect to the luminance transition zone in said transverse direction;
the functional step of amplitude modulation consists in maintaining a group G consisting of the first and second optical sensors or a group G' consisting of the first and second optical sensors and a lens are stationary, while the luminance transition zone itself is vibrating;

the vibration of the optical axes ($O_1Y_1$, $O_2Y_2$) of the first and second optical sensors in the transverse direction, is carried out by natural vibrations of a platform supporting the device;

the method comprises a step of demodulation of the signals delivered by the first and the second optical sensors before the step of calculating the output signal, the output signal being calculated starting from the demodulated signals;

the demodulation is an asynchronous demodulation, a synchronous demodulation or an envelope detection of the signals delivered by the first and the second optical sensors;

the method comprises an additional step consisting of
comparing the phases of the two temporally filtered signals, and
determining whether the contrasting edge is a single contrasting edge or part of a thin bar, on the basis that two temporally filtered signals, measured for a single contrasting edge, are in phase and that two temporally filtered signals, measured for a thin bar, have opposite phases, a thin bar being the succession of two contrasting edges of opposite polarities.

The invention also relates to a device for measuring the angular position of a contrasting edge of an object having a luminance transition zone which is substantially rectilinear in a given direction, the device comprising at least a first and a second optical sensor having an inter-receptor angle ($\Delta\phi$) delimited by the optical axes ($O_1Y_1$, $O_2Y_2$) of the first and second optical sensors, and the inter-receptor angle ($\Delta\phi$) containing the object with the luminance transition zone, the device being characterized in that it further comprises:

a means for vibrational displacement of the optical axes ($O_1Y_1$, $O_2Y_2$) of the first and second optical sensors in another direction transverse to the given direction, and a detection circuit comprising a means for calculating an output signal ($Y_{out}(t)$) starting from the signals delivered by the first and the second optical sensors as a function of the angular position ($\psi_c(t)$) of the luminance transition zone, the output signal being independent of the vibrational law, and dependent on the angular position of the luminance transition zone.

In other embodiments, the device for measuring the angular position comprises one or several of the following features, taken in isolation or in any technically feasible combination:

the first and second optical sensors are each formed by a photoelectric sensor;

the device comprises a lens having an optical center, the first and second optical sensors being placed substantially in the image focal plane of the lens and the average directions of observation of the first and second optical sensors corresponding substantially to two lines linking the centers ($O_1$, $O_2$) of the first and second optical sensors and the optical center of the lens; and the means for vibrational displacement comprises, when said lens is stationary:

a support element integral on the one hand, with a group G formed by the first and second optical sensors and, on the other hand, with a stationary reference mechanical support;

a means for applying, to said support element, a stress for controlling displacement to generate a translational displacement in the other direction of the group G formed by the first and second optical sensors relative to said stationary reference mechanical support;

the device comprises a lens having an optical center, the first and second optical sensors being placed substantially in the image focal plane of the lens and the average directions of observation of the first and second optical sensors corresponding substantially to two lines linking the centers ($O_1$, $O_2$) of the first and second optical sensors and the optical center of the lens; and the means for vibrational displacement in the other direction comprises, when a group G formed by the first and second optical sensors is stationary:

a support element integral, on the one hand, with said lens and, on the other hand, with a stationary reference mechanical support;

a means for applying, to said support element, a stress for controlling displacement to generate a translational displacement of the lens relative to said stationary reference mechanical support;

the device comprises a lens having an optical center, the first and second optical sensors being placed substantially in the image focal plane of the lens and the average directions of observation of the first and second optical sensors corresponding substantially to two lines linking the centers ($O_1$, $O_2$) of the first and second optical sensors and the optical center of the lens; and the means for vibrational displacement in the other direction comprises:

a support element integral, on the one hand, with an group G' formed by the lens and the first and second optical sensors and, on the other hand, with a stationary reference mechanical support;

a means for applying to said support element a stress for controlling displacement to generate a rotational displacement, around an axis parallel to the other direction, of said group G' relative to said stationary reference mechanical support;

the given direction and the other direction transverse to the given direction are orthogonal;

the detection circuit comprises a demodulator for demodulating the signals delivered by the first and the second optical sensors;

the device further comprises a means for orienting an assembly $a_1$ formed by the support element, the lens and the stationary reference mechanical support or an assembly $a_2$ formed by the support element, the group G of the first and second optical sensors, and the stationary reference mechanical support, in order to orient the direction of the vibrational displacement of the lens or of the group G in this other direction transverse to said given direction of the substantially rectilinear luminance transition zone.

The invention also relates to a set of devices for measuring the angular position characterized in that it comprises at least one lens, at least three optical sensors and a plurality of detection circuits, each pair of two consecutive optical sensors being placed close to the focal plane of one of the at least one lens and connected to one of the plurality of detection circuits; in that one device is formed by a pair of two optical sensors, one of the at least one lens and one detection circuit according to the invention; and in that each lens of the at least one lens and each optical sensor are arranged substantially on a spherical, cylindrical or curved surface surrounding at least one local common centre, the at least one local common centre constituting the optical centre of an inter-receptor angle ($\Delta\phi$) which is the sum over all inter-receptor angles ($\Delta\phi_i$) of each of the devices taken together.

In other embodiments, the set of devices for measuring the angular position comprises one or several of the following features, taken in isolation or in any technically feasible combination:

the devices forming the set of devices are arranged in two directions substantially orthogonal;

the optical sensors have a spectral sensitivity which can be the same or different for the individual optical sensors.

The method and device for measuring the angular position of a contrasting edge, according to the present invention, are used for industrial, noncontact and high accuracy measurements of the angular position of a contrasting edge. They are also used for industrial implementation of systems for fixating and fine tracking a target having at least one contrasting edge, in which a method for compensating for the line of sight akin to the VOR (for Vestibulo Ocular Reflex) process of human sight can be employed, owing (a) to the high precision and high speed of this method and this device and (b) to the high miniaturization and extreme lightness of this device, whose very low inertia permits such implementation in a particularly noteworthy manner.

The invention also relates to a steering aid system for the visual fixation and fine tracking of a target, the target being an object comprising at least one contrasting edge having a luminance transition zone which is substantially rectilinear in a given direction and for controlling the angular speed of an aircraft, characterized in that it comprises:

a device or set of devices for measuring the relative angular position of the contrasting edge of the target according to the invention;

a device for measuring a relative angular velocity of the contrasting edge of the target;

a means to maintain the line of sight of the steering aid system constantly on the angular position ($\Psi_c$) of the contrasting edge; and a means to control an angular speed of the aircraft according to the angular position and angular velocity of the target.

BRIEF DESCRIPTION OF THE SEVERAL
VIEWS OF THE DRAWINGS

The invention will be better understood from the description below, which is provided solely by way of example and which refers to the drawings, wherein:

FIGS. 11 to 13 are schematic representations of different embodiments of a demodulator integrated into the device for measuring the angular position of a contrasting edge according to the invention;

FIG. 15 is a schematic representation of a part of the detection circuit of the device for measuring an angular velocity according to the invention;

FIGS. 19 to 22 are schematic representations of different embodiments of an estimator of the time delay between the two signals delivered by two optical sensors of the device for measuring an angular velocity according to the invention.

DETAILED DESCRIPTION OF THE INVENTION

A more detailed description of the method and the device for measuring the angular position of a contrasting edge, which is substantially rectilinear in a given direction, according to the present invention, will now be given with reference to the FIGS. 1 to 13.

Figure 1:
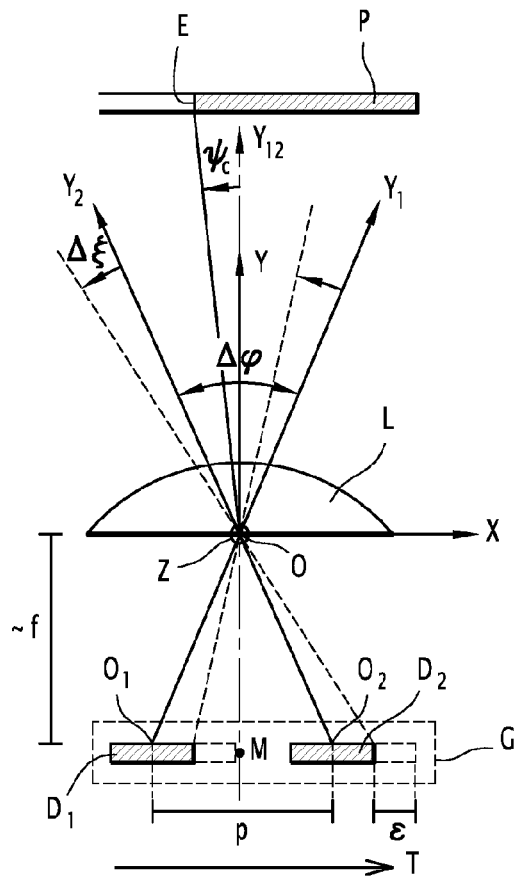
FIG. 1 is a schematic representation of the implementation of the method for measuring the angular position of a contrasting edge according to the invention.

Referring to FIG. 1, the luminance transition zone and, in particular, the contrasting edge E of an object P are rectilinear in a direction along the Z axis which is substantially orthogonal to the plane containing FIG. 1.

Figure 2:
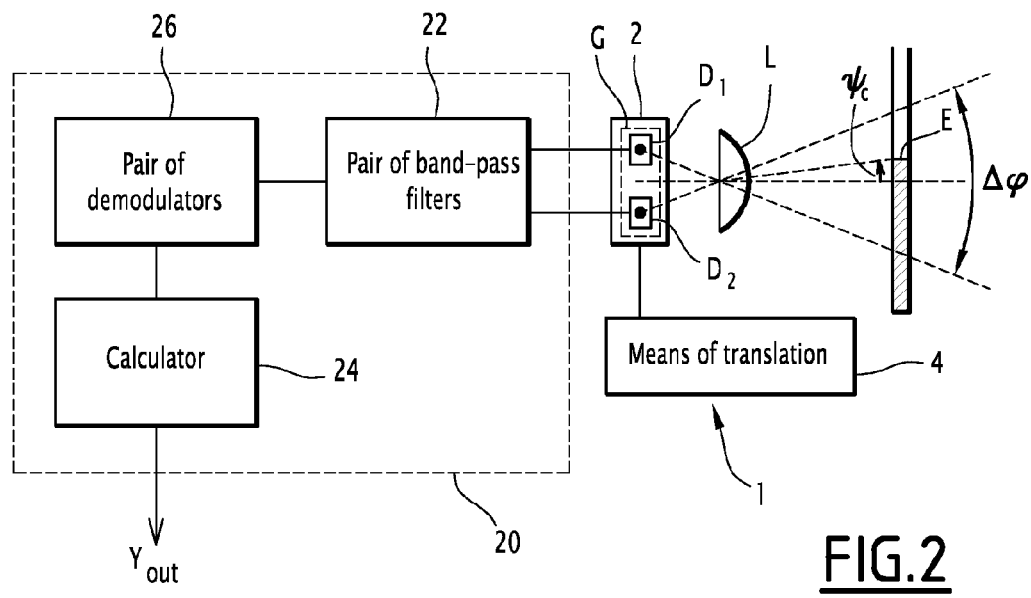
FIG. 2 is a schematic representation of the overall device for measuring the angular position of a contrasting edge according to the invention.

In reference to FIG. 2, the device for measuring the angular position according to the invention comprises at least a first and a second optical sensor $D_1$ and $D_2$ whose optical axes are separated by an inter-receptor angle $\Delta\phi$.

In a non-limiting embodiment, this inter-receptor angle $\Delta\phi$ is determined by a convex lens L, as shown in FIG. 1, the optical sensors $D_1$ and $D_2$ being placed substantially in the focal plane of the lens L. The optical center O of the lens L is located between the optical sensors $D_1$, $D_2$ and the luminance transition zone. The optical axes of the first and second optical sensors $D_1$, $D_2$ correspond substantially to the lines linking the centers $O_1$ and $O_2$ of the first and second optical sensors, respectively, and the nodal point of the lens assembly, which for the sake of simplicity shall be called here the optical center O of the lens L. The optical axes $O_1Y_1$ and $O_2Y_2$ delimit the inter-receptor angle denoted by $\Delta\phi=(O_1Y_1, O_2Y_2)=(OO_1, OO_2)$.

The angular position of the contrasting edge E relative to a reference direction lying within the inter-receptor angle $\Delta\phi$ is denoted by $\psi_C$. The reference direction is advantageously the direction $MOY_{12}$ substantially corresponding to the average direction of the bisector between the optical axes $O_1Y_1$ and $O_2Y_2$ of the first and second optical sensors $D_1$, $D_2$.

In a preferred non-limiting embodiment, the first and the second optical sensors $D_1$ and $D_2$ are each formed by a photoelectric receiver such as a photoelectric diode, whose spectral sensitivity can be selected in the spectral range of visible or ultraviolet light or, alternatively, in the range of near or far infrared radiation—for example for nocturnal or all-weather conditions.

The wavelength of maximum sensitivity of the aforementioned photodiodes can thus be chosen in dependence of the specific application of the device for measuring the angular position of a contrasting edge E according to the present invention.

Furthermore, the device comprises a means 1 (see FIG. 2) for the joint angular vibration of the optical axes $O_1Y_1$ and $O_2Y_2$ of the first and second optical sensors $D_1$ and $D_2$ in a transverse direction that is different from the given direction.

The given direction, which is substantially parallel to the Z axis, and the transverse direction are different, preferably orthogonal to each other.

Moreover, according to a particularly noteworthy aspect of the device and the method according to the invention, the vibrational law of the optical axes of the first and second optical sensors can be indifferent, aperiodic, unknown and even random without affecting the precision of the angular localization of the contrasting edge.

In FIG. 2, the lens L is stationary and the vibration of the optical axes of the first and second optical sensors $D_1$ and $D_2$ is carried out by the translational displacement of a group G formed by the first and second optical sensors $D_1$ and $D_2$. Thus, means 1 for vibrational displacement comprises a support element 2 which is integral, on the one hand, with said group G formed by the first and second optical sensors $D_1$ and $D_2$ and, on the other hand, with a stationary reference mechanical support (not shown in FIG. 2). Means 1 further comprises a means of translation 4 which applies to said support element 2 a stress for controlling the displacement, and hence, for generating a translational displacement in the transverse direction of the group G relative to said stationary reference mechanical support.

Some examples of the means of translation 4 for generating a translational displacement of the group G are shown and described in patent document FR 2 869 494 (PCT: WO 2005/111536 A1). In these examples, however, the vibrational law is always limited to a periodic vibrational law.

Moreover, the device for measuring the angular position of the contrasting edge according to the invention comprises a detection circuit 20 (see FIG. 2) in order to calculate the angular position $\psi_C$ of the contrasting edge E, on the basis of the signals $Ph_1$ and $Ph_2$ delivered by the first and the second optical sensors $D_1$ and $D_2$, respectively. The detection circuit 20 is connected to the first and second optical sensors and receives the signals $Ph_1(t)$ and $Ph_2(t)$ delivered by the first and second optical sensors $D_1$ and $D_2$, respectively.

The detection circuit 20 comprises a pair of band-pass filters 22, each of which is connected to an optical sensor, D1 or D2, in order to calculate the differentiated signals, denoted by $Ph_1'$ and $Ph_2'$, of the first and second optical sensors, respectively.

Moreover, the detection circuit comprises a calculator 24 for calculating an output signal $Y_{out}$ and the angular position $\psi_C$ of the contrasting edge E depending on the output signal $Y_{out}$.

Furthermore the detection circuit 20 comprises advantageously a pair of demodulators 26 connected between the band-pass filters 22 and the calculator 24, in order to demodulate the signals delivered by the first and the second optical sensors $D_1$, $D_2$ before calculating the output signal $Y_{out}$ and the angular position $\psi_C$. The demodulation of these two signals allows one to extract the information of amplitude of these two signals from noise. The amplitude of the differentiated signals is determined using the pair of demodulators 26. The demodulated signals are then used for the calculation of the output signal $Y_{out}$.

Three techniques of amplitude demodulation, adapted to three different situations, make it possible to extract the amplitude of the two signals in a robust way. A more detailed description of these techniques and the corresponding demodulators 26 will be given later.

A more detailed description of the method for measuring the angular position of the contrasting edge according to the present invention will now be given.

Figure 3:
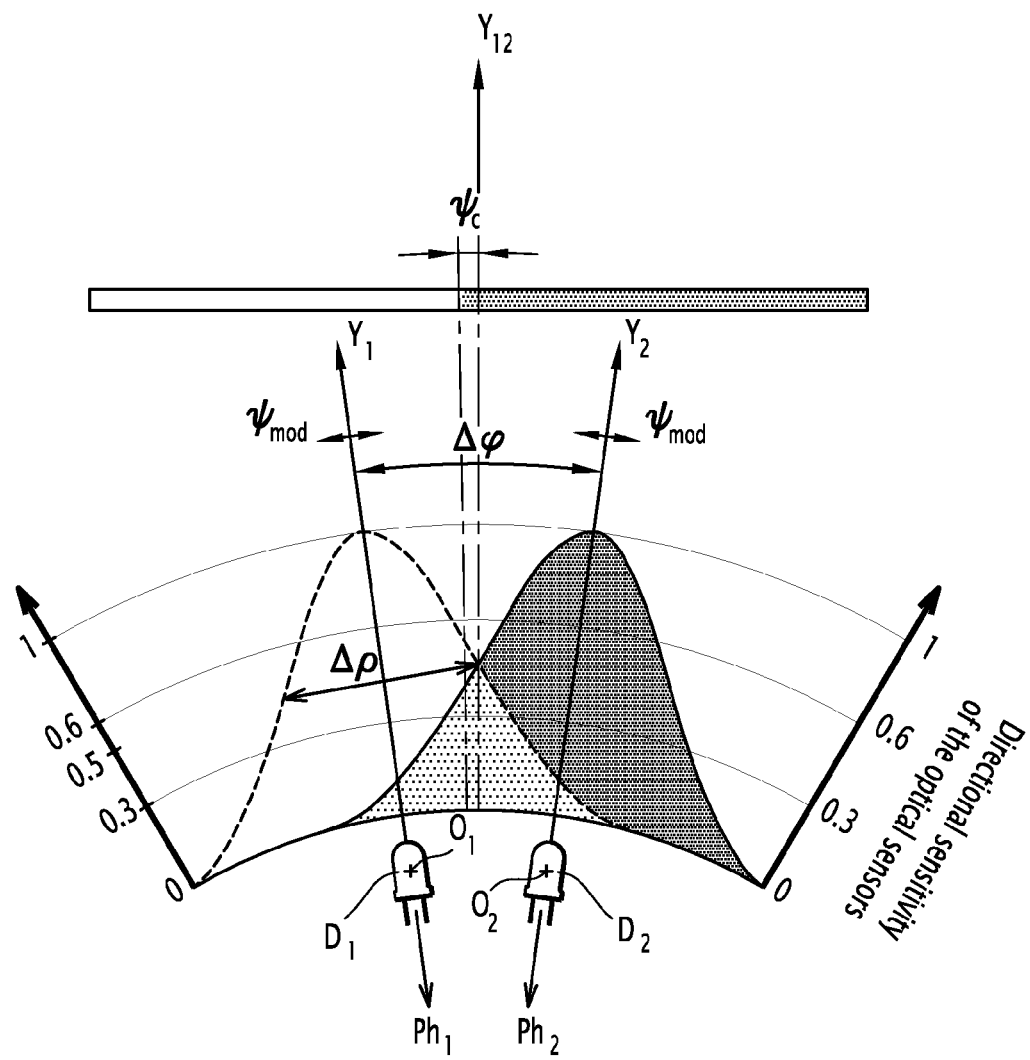
FIG. 3 is a schematic representation of the directional sensitivity of the optical sensors integrated in the device for measuring the angular position of a contrasting edge according to the invention.

The lens L placed in front of the two optical sensors confers them a given angular sensitivity. The angular sensitivity function is a bell-shaped (Gaussian-like) function, as shown in FIG. 3. The angular sensitivity functions of the two optical sensors $D_1$ and $D_2$ are partially overlapping. The Gaussian-like angular sensitivity function is obtained by slightly defocusing the system consisting of the lens and the optical sensors, whereby the two optical sensors $D_1$ and $D_2$ are placed close to the focal plane, between the lens L and its focal plane. The inter-receptor angle $\Delta\phi$ is delimited by the optical axes $O_1Y_1$ and $O_2Y_2$ which correspond to the maximum sensitivity of each of the optical sensors $D_1$ and $D_2$, respectively.

The first and second optical sensors $D_1$ and $D_2$ have each a directional sensitivity, $s(\psi)$ according to the angle $\Psi$ of the light source:

$$s(\psi) = \frac{1}{\sigma\sqrt{2\pi}} e^{-\frac{\psi^2}{2\sigma^2}}$$

The parameter $\Delta\rho$ is the full width at half maximum (FWHM) of the angular sensitivity function and results directly from the variance $\sigma^2$ of the Gaussian curve by $\Delta\rho = \sigma \times 2\sqrt{2\ln 2}$.

Typical optical characteristics of the optical device are: $\Delta\rho = 3°$ and $\Delta\phi = 2.87°$, which gives a ratio $\Delta\rho:\Delta\phi$ of 1.04

Placed in front of a contrasting edge, each optical sensor gives the integral of the product of its angular sensitivity function $s(\psi)$ and the luminance of the contrasting edge E. For example, the contrasting edge is a white/black contrasting edge, where the luminance of the dark zone is 0%, and the luminance of the white zone is 100%. The angular position of the contrasting edge E in the reference frame of the optical sensor is denoted by $\psi_C$.

The response of an optical sensor, like a photodiode, is the spatial integral of its angular sensitivity function over the whole white zone:

$$\int_{-\infty}^{\psi_c} s(\psi)d\psi = \int_{-\infty}^{\psi_c} \frac{1}{\sigma\sqrt{2\pi}} e^{-\frac{\psi^2}{2\sigma^2}} d\psi \qquad (1)$$

The integral (Eq. 1) does not have an analytical expression. The error function erf is defined as twice the integral of the Gaussian function with a variance $\sigma^2 = \frac{1}{2}$ and centred on 0:

$$\mathrm{erf}(\psi) = \frac{2}{\sqrt{\pi}} \int_0^\psi e^{-x^2} dx \qquad (2)$$

The primitive of the integral of the angular sensitivity function of an optical sensor is denoted by S, which is equal to 0 in $-\infty$:

$$S(\psi_c) = \int_{-\infty}^{\psi_c} s(\psi) d\psi = \frac{1}{2}\left(1 + \mathrm{erf}\left(\frac{\psi_c \times 2\sqrt{\ln 2}}{\Delta \rho}\right)\right) \qquad (3)$$

Each optical sensor converts the signal into a current. The signals delivered by the first and second optical sensors $D_1$ and $D_2$ are denoted by $Ph_1$ and $Ph_2$.

Based on Eq. (3), one can calculate the responses of the two optical sensors $D_1$ and $D_2$ with their optical axes separated by $\Delta\phi$ and located at $$+\frac{\Delta\varphi}{2} \text{ and } -\frac{\Delta\varphi}{2}$$

from $MOY_{12}$, respectively, as:

$$Ph_1(\psi) = k \times S\left(\psi - \frac{\Delta\varphi}{2}\right) + \mathit{Offset}_{Ph1} \qquad (4)$$

$$= k \times \frac{1}{2}\left(1 + \mathrm{erf}\left(\frac{\left(\psi - \frac{\Delta\varphi}{2}\right) \times 2\sqrt{\ln 2}}{\Delta\rho}\right)\right) + \mathit{Offset}_{Ph1}$$

$$Ph_2(\psi) = k \times S\left(\psi + \frac{\Delta\varphi}{2}\right) + \mathit{Offset}_{Ph2}$$

$$= k \times \frac{1}{2}\left(1 + \mathrm{erf}\left(\frac{\left(\psi + \frac{\Delta\varphi}{2}\right) \times 2\sqrt{\ln 2}}{\Delta\rho}\right)\right) + \mathit{Offset}_{Ph2}$$

The gain k represents the difference in luminance between the two surfaces constituting the contrasting edge and depends at the same time on contrast and ambient illumination.

The method according to the invention comprises a step of modulating in a transverse direction, different from the given direction, the amplitude of the signals delivered by the first and the second optical sensors $D_1$ and $D_2$, by joint vibration of the optical axes $O_1Y_1$ and $O_2Y_2$ of the first and second optical sensors $D_1$ and $D_2$, respectively.

The given direction, substantially along the Z axis, and the transverse direction are preferably orthogonal to each other.

The vibration of the optical axes $O_1Y_1$ and $O_2Y_2$ of the first and second optical sensors $D_1$ and $D_2$, respectively, involves a vibration of the inter-receptor angle $\Delta\phi$ of the first and second optical sensors $D_1$ and $D_2$.

Referring to FIG. 1, the vibration of the optical axes $O_1Y_1$ and $O_2Y_2$, and therefore of the inter-receptor angle $\Delta\phi$, is carried out in the plane OXY of FIG. 1.

The step of amplitude modulation results from subjecting the lens L or the group G, formed by the first and second optical sensors $D_1$ and $D_2$, to a translational vibration in the transverse direction.

According to a first embodiment of the method and in reference to FIGS. 1 and 2, vibration of the inter-receptor angle $\Delta\phi$ is carried out by relative translational scanning in the transverse direction of the group G formed by the first and second optical sensors $D_1$ and $D_2$ with respect to the lens L which is kept stationary with respect to the stationary reference mechanical support. The plane OXY of the FIG. 1 contains this transverse direction, and translational scanning in the transverse direction is denoted by T and is represented by an arrow in FIG. 1.

Thus, a linear displacement of amplitude c applied to the group G formed by the first and the second optical sensors $D_1$ and $D_2$, according to the translational scanning T, causes rotation of the inter-receptor angle $\Delta\phi$ and therefore causes each direction of observation $OY_1$, $OY_2$ to rotate by an angle $\Delta\xi$, when the lens L is stationary.

Alternatively, a linear displacement applied to the lens L, of the same amplitude $\epsilon$ but in the opposite direction, in front of the first and second optical sensors $D_1$ and $D_2$ kept stationary with respect to the stationary reference mechanical support, will cause the directions of observation $OY_1$, $OY_2$, and therefore the inter-receptor angle $\Delta\phi$, to rotate by the same angle $\Delta\xi$.

The temporal evolution of the angular position denoted by $\Psi(t)$ of the contrasting edge relative to the optical axes of the first and second optical sensors $D_1$ and $D_2$, as seen from the sensors, is the superposition of the relative angular position of the contrasting edge $\Psi_c(t)$ with respect to the bisector $MOY_{12}$ of the optical axes of the optical sensors, and of the modulation function $\Psi_{mod}(t)$ which results from the vibration effect on the optical axes of the first and second optical sensors:

$$\psi(t) = \psi_C(t) + \psi_{mod}(t)$$

Each of the signals from the optical sensors $D_1$ and $D_2$ is filtered in order to extract their dynamical part by the pair of band-pass filters 22, which are generally analog circuits (FIG. 1).

Part of the band-pass filters 22 essentially acts as a temporal differentiator of the signals delivered by the first and second optical sensors $D_1$ and $D_2$. The band-pass filters 22 also cancel the DC component and the high frequency noise, while acting as anti-aliasing filters for the subsequent digital processing. The differentiated signals are denoted by $Ph_1'(t)$ and $Ph_2'(t)$. The expression of the differentiated signals is:

$$Ph_1'(\psi_c(t)) = k \times \frac{\psi_c'(t)}{\sigma\sqrt{2\pi}} \times \exp\left(-\frac{\left(\psi_c(t) - \frac{\Delta\varphi}{2}\right)^2}{2\sigma^2}\right) \qquad (5)$$

$$Ph_2'(\psi_c(t)) = k \times \frac{\psi_c'(t)}{\sigma\sqrt{2\pi}} \times \exp\left(-\frac{\left(\psi_c(t) + \frac{\Delta\varphi}{2}\right)^2}{2\sigma^2}\right)$$

Then, the pair of demodulators 26 isolates the envelope of the differentiated signals.

The output signal $Y_{out}$ is calculated by the calculator 24 starting from the demodulated signals of $Ph_1'(t)$ and $Ph_2'(t)$. The desired output signal $Y_{out}$ should depend only on the angular position $\psi_c$ of the luminance transition zone within the inter-receptor angle $\Delta\phi$, and should be, in particular, independent of the vibrational law. A convenient expression for the output signal $Y_{out}$ is the difference-to-sum ratio of the amplitudes of these temporally differentiated signals:

$$Y_{out}(t) = \frac{|Ph_1'(t)| - |Ph_2'(t)|}{|Ph_1'(t)| + |Ph_2'(t)|}$$

This ratio allows for the reduction of the common mode noise originating, e.g., from ambient artificial light (100 Hz and higher harmonics, if the frequency of the mains is 50 Hz), while providing a response which is independent from the luminance, the contrast, and the vibrational law.

Finally, the output signal $Y_{out}$ delivered by the calculator 24 is:

$$Y_{out}(t) = \tanh\left(\Psi_c \cdot \frac{4\Delta\varphi \log(2)}{\Delta\rho^2}\right) \quad (6)$$

This method to detect a contrasting edge is also applicable to the detection of a bar, a bar being the succession of two contrasting edges of opposite polarities.

Indeed, in the same manner, for a bar of width I and centred on $\psi_C$, the responses of the two photodiodes are:

$$Ph_{1bar}(\psi) = k \times \left[ S\left(\psi - \frac{\Delta\varphi}{2} + \frac{l}{2}\right) - S\left(\psi - \frac{\Delta\varphi}{2} - \frac{l}{2}\right) \right] + Offset_{Ph1} \quad (7)$$

$$Ph_{2bar}(\psi) = k \times \left[ S\left(\psi + \frac{\Delta\varphi}{2} + \frac{l}{2}\right) - S\left(\psi + \frac{\Delta\varphi}{2} - \frac{l}{2}\right) \right] + Offset_{Ph2}$$

With this expression, a white bar on a black zone is modelled with a width I>0 and a black bar on a white zone is modelled with a width I<0.

Based on equations 1 and 7, the temporal differentiation realized by the band-pass analog circuit is:

$$Ph'_{1bar}(\psi(t)) = \quad (8)$$

$$k \times \frac{\psi'(t)}{\sigma\sqrt{2\pi}} \times \exp\left(-\frac{\left(\psi(t) - \frac{\Delta\varphi}{2}\right)^2 + \frac{l^2}{4}}{2\sigma^2}\right) \times \sinh\left[\left(\psi(t) - \frac{\Delta\varphi}{2}\right) \times \frac{l}{2\sigma^2}\right]$$

$$Ph'_{2bar}(\psi(t)) = k \times \frac{\psi'(t)}{\sigma\sqrt{2\pi}} \times$$

$$\exp\left(-\frac{\left(\psi(t) + \frac{\Delta\varphi}{2}\right)^2 + \frac{l^2}{4}}{2\sigma^2}\right) \times \sinh\left[\left(\psi(t) + \frac{\Delta\varphi}{2}\right) \times \frac{l}{2\sigma^2}\right]$$

Figure 4:
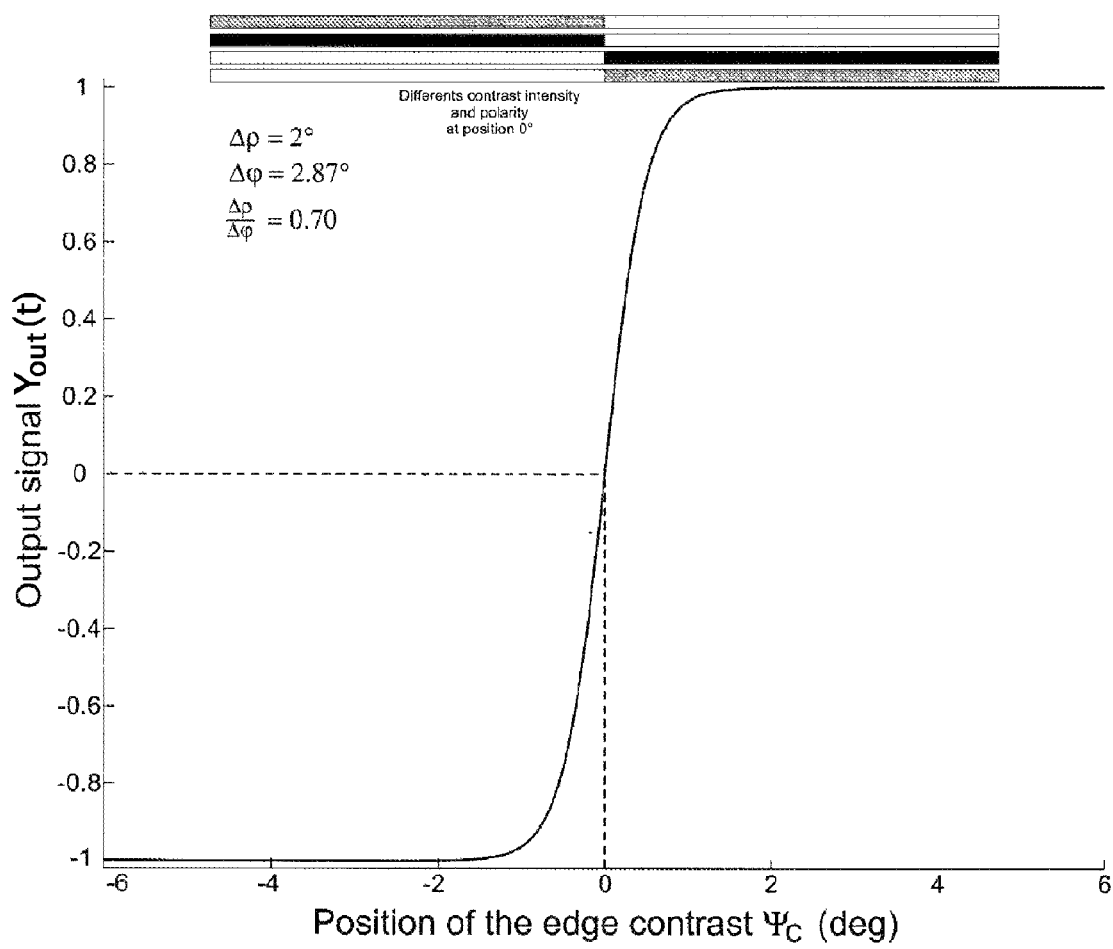
FIGS. 4 and 5 represent the calculated device output signal ($Y_{out}(t)$) as a function of the angular position $\psi_C$ of a contrasting edge (FIG. 4) and of a contrasting bar (FIG. 5) according to the invention.
Figure 5:
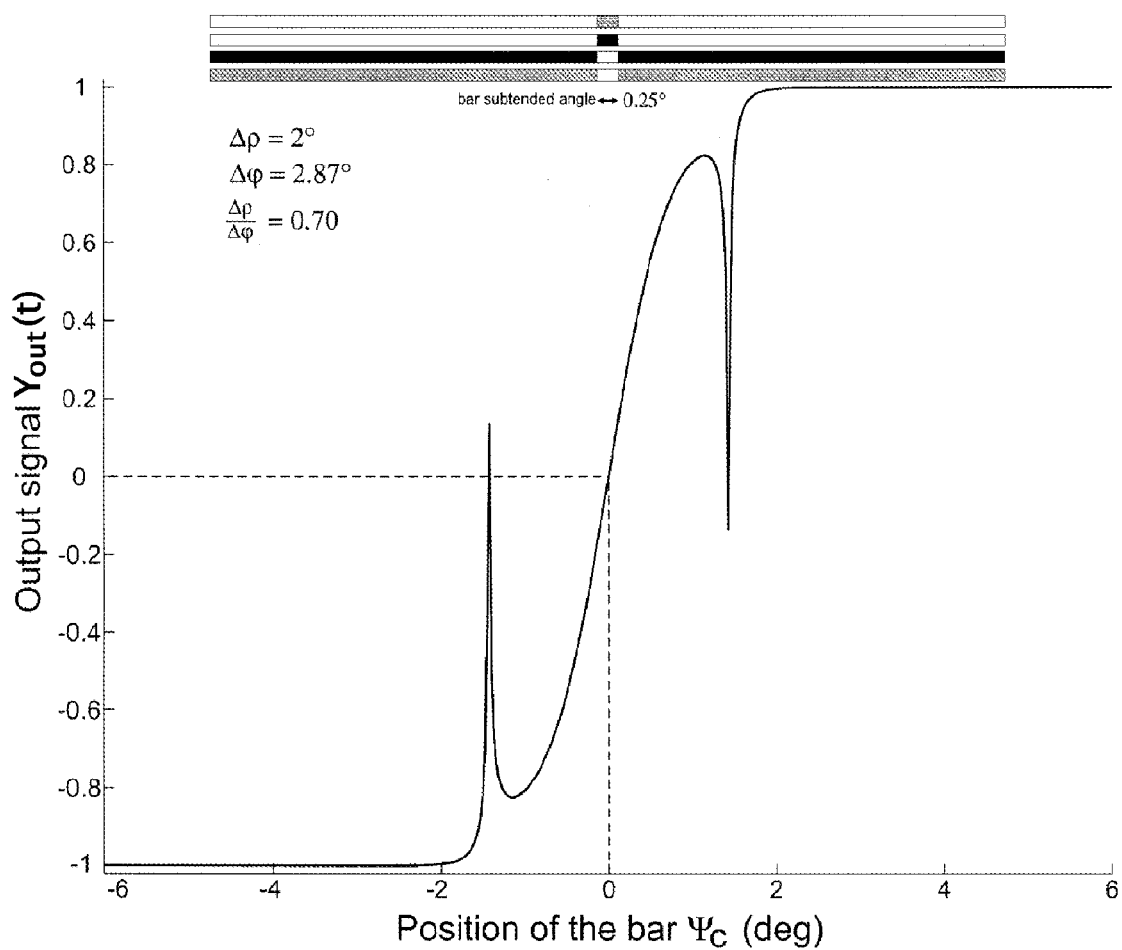

FIGS. 4 and 5 show the theoretical output signal $Y_{out}$ as a function of the angular position $\Psi_c$ of the contrasting pattern, for an edge (FIG. 4) and for a thin bar (FIG. 5). The signal shown in FIG. 4 turns out to be a monotonic and odd function of the angular position $\Psi_c$ of the contrasting edge, as expected from the tan h function in Equation. 6. The output signal $Y_{out}$ is symmetrical with respect to the origin ($\Psi_c=0, Y_{out}(t)=0$). In addition, the output signal $Y_{out}$ saturates for the offset positions.

Figure 6:
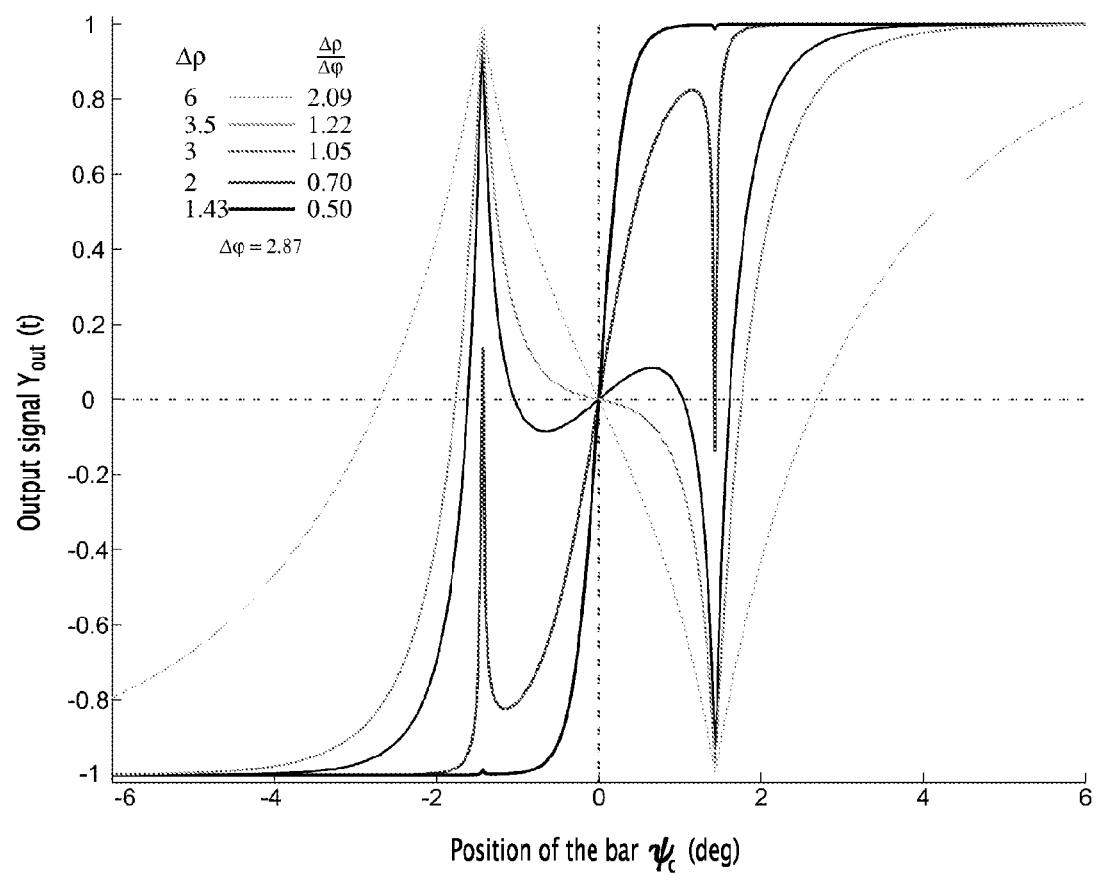
FIG. 6 represents the calculated device output signal ($Y_{out}(t)$) as a function of the angular position $\psi_C$ of a contrasting bar, plotted for various ratios of the full width at half maximum (FWHM) $\Delta\rho$ to the inter-receptor angle $\Delta\phi$.

FIG. 5 shows the theoretical response curve to a thin bar. The response curve is again symmetrical with respect to the origin ($\Psi_c=0, Y_{out}(t)=0$) but not completely monotonic since two peaks appear on either side of the abscissa $\Psi_c=0$. It can be shown, however, that these two peaks disappear when the amplitude of the vibration grows larger. In any case, the monotonic and odd central part of the graph can be used for locating a thin bar with high precision. Moreover, it allows one to distinguish between a thin bar and an edge, since in the presence of a bar, the two differentiated signals $Ph_1'(t)$ and $Ph_2'(t)$ have opposite phases, whereas they are in phase in the case of an edge. In addition, as shown in FIG. 6, the ratio of the full width at half maximum (FWHM) $\Delta\rho$ to the inter-receptor angle $\Delta\phi$ can be adjusted such as to make the optical sensor sense and locate only contrasting steps or both contrasting steps and bars.

FIGS. 7A to 7J shows the experimental signals obtained for the different steps according to the method for optical detection of a rectilinear contrasting edge.

Figure 7A:
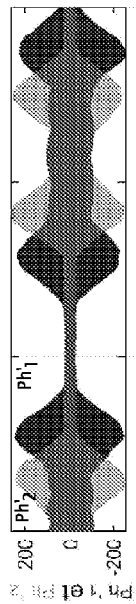
FIGS. 7A to 7J shows the signals obtained at the different steps of the method for measuring the angular position according to the invention, when considering a sinusoidal vibrational law whose amplitude)(0.25°) is much smaller than the inter-receptor angle $\Delta\phi$.
Figure 7B:
Figure 7C:
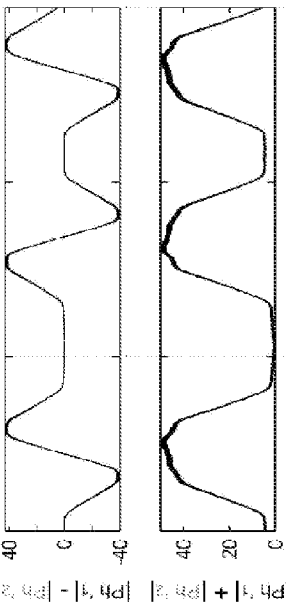

The joint vibration of the optical axes of the optical sensors $D_1$ and $D_2$ is carried out by their relative translational displacement (FIG. 2) according to the modulation function $\Psi_{mod}(t)$ represented in FIG. 7A. Here, a sine wave modulation was chosen for the sake of simplicity. The frequency of this sinusoidal modulation (FIG. 7A) is 40 Hz and its peak-to-peak amplitude is 0.5°, a value much smaller than the inter-receptor angle $\Delta\phi$ which is 2,87°. FIG. 7B shows the time course of the actual position of the contrasting edge $\Psi_c(t)$ with respect to the bisector $MOY_{12}$ of the two optical axes $O_1Y_1$ and $O_2Y_2$. FIG. 7C shows the output of the device, which estimates the angular position $\Psi(t)$ of the contrasting edge from both the actual position of the contrasting edge $\Psi_c(t)$ (FIG. 7B) and the modulation function $\Psi_{mod}(t)$ (FIG. 7A).

Figure 7D:
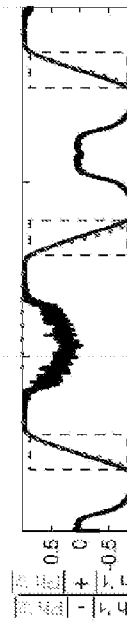
Figure 7E:
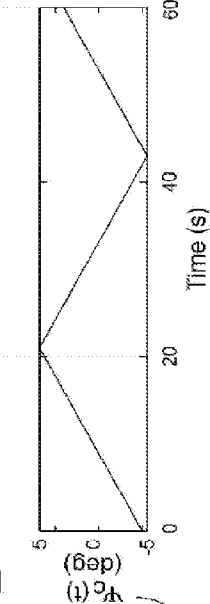

FIG. 7E shows the analogically differentiated signals $Ph_1'$ and $Ph_2'$ of the first and second optical sensors $D_1$ and $D_2$, respectively.

Figure 7F:
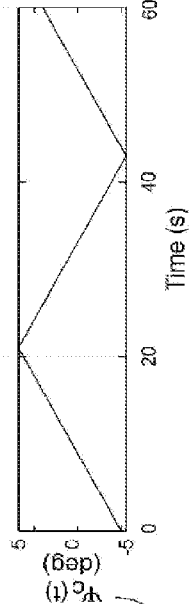

FIG. 7F shows the two signals of FIG. 7E after digital filtering and demodulation.

Figure 7G:
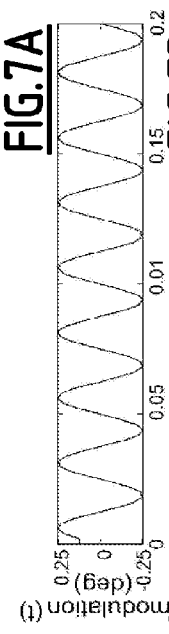
Figure 7H:
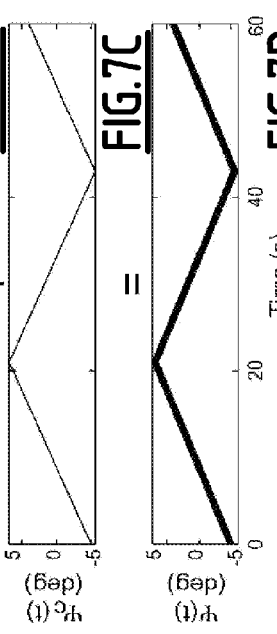

FIGS. 7G and 7H show the difference and the sum of the demodulated signals of FIG. 7F, respectively.

Figure 7I:
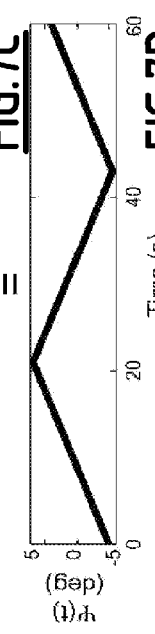
Figure 7J:
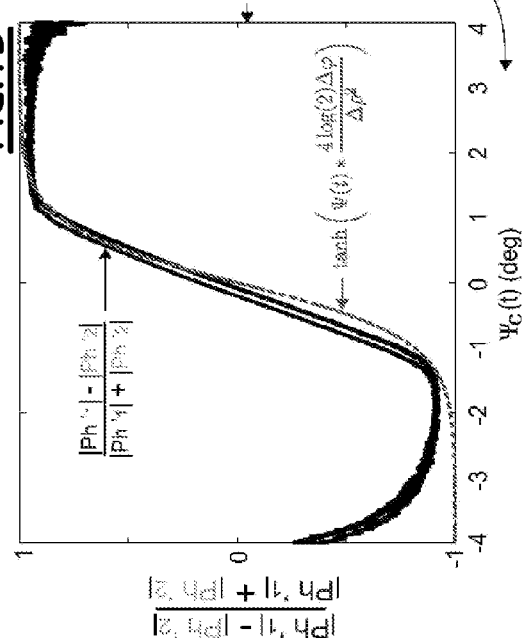

Finally, FIG. 7I shows the temporal evolution of the output signal $Y_{out}(t)$, which is the difference-to-sum ratio of the demodulated signals $Ph_1'$ and $Ph_2'$. In some parts of the graph (identified in small boxes) it can be seen that the output signal $Y_{out}(t)$ is a linear function of time. Each of these parts is indicative of the presence of a contrasting edge.

FIG. 7D gives the experimental output signal $Y_{out}(t)$ as a function of the angular position $\Psi_c(t)$ of the contrasting edge and compares it with a theoretical curve (dashed line). The theoretical line has been calculated using Equation 6 with $\Delta\rho=2.00°$ and $\Delta\phi=2.87°$.

Figure 8:
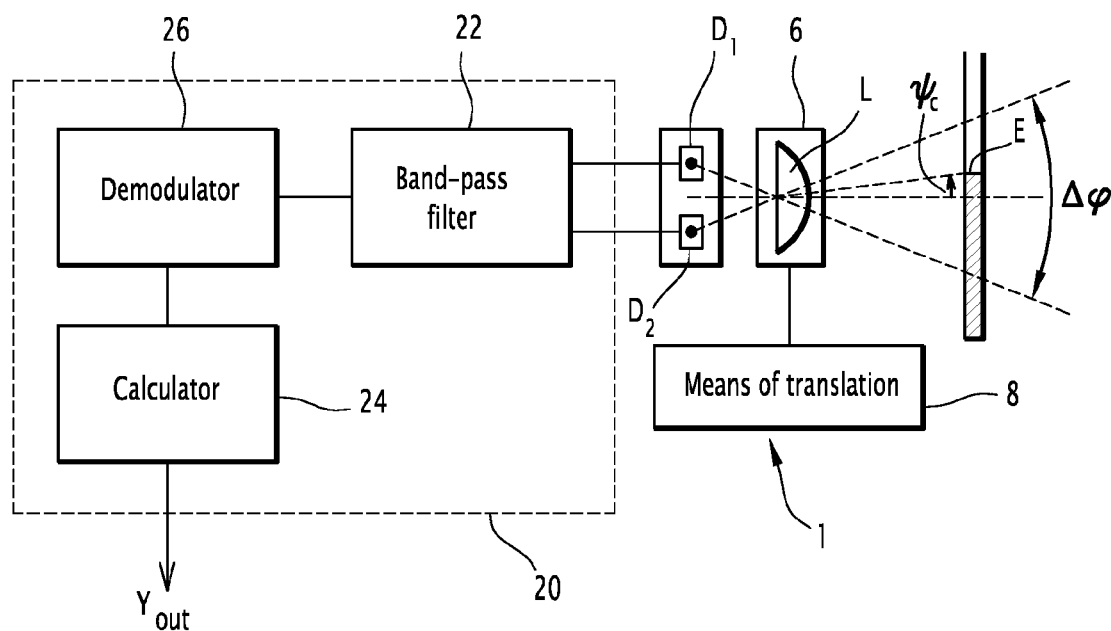
FIG. 8 is a schematic representation of another embodiment of the device for measuring the angular position of a contrasting edge according to the invention.

In a second embodiment shown in FIG. 8, the means 1 for vibrational displacement comprises a support element 6 bearing the lens L. Here, the vibration of the optical axes of the first and second optical sensors $D_1$ and $D_2$ is realized by the translational vibration of the support element 6 and hence of the lens L itself, while the group G formed by the first and second optical sensors $D_1$ and $D_2$ remains stationary.

Means 1 for translational vibration of the lens L comprises a means of translation 8 for translational displacement of the support element 6 supporting the lens L. For example, the means of translation 8 comprises an actuator for generating the translational displacement of the lens L, like the actuator described in patent document FR 2 869 494.

Figure 9:
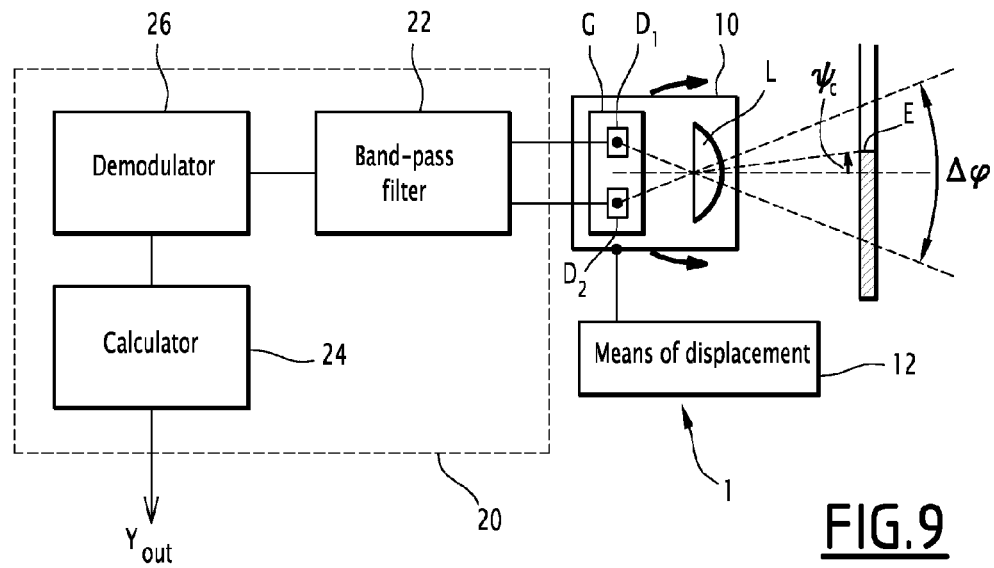
FIGS. 9 and 10 are schematic representations of yet another implementation of the method for measuring the angular position of a contrasting edge according to the invention.

In a third embodiment of the device shown in FIG. 9, the means 1 for vibrational displacement comprises a support element 10 integral, on the one hand, with a group G' formed by the lens L and the first and second optical sensors $D_1$ and $D_2$ and, on the other hand, with a stationary reference mechanical support.

Furthermore, means 1 for vibrational displacement comprises a means of displacement 12 for applying, to said support element 10, a stress for controlling the displacement in order to generate a rotational displacement of said group G' in the transverse direction relative to said stationary reference mechanical support.

Figure 10:
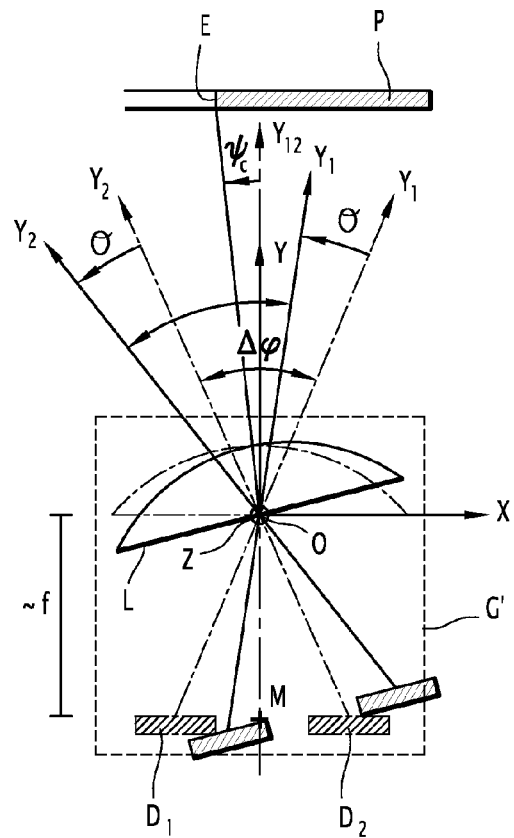

In this particular case, according to the method of the invention, a vibration of the optical axes $O_1Y_1$ and $O_2Y_2$ of the first and second optical sensors $D_1, D_2$, in the transverse direction, is carried out by relative rotation of the group G' formed by the first optical sensor $D_1$, the second optical sensor $D_2$ and the lens L, around another axis substantially parallel to the given direction (see FIG. 10).

As an example, referring to FIG. 10, a rotation around the OZ axis by an angle θ applied to the group G' causes rotation by the same angle θ of the directions of observation $OY_1$, $OY_2$ and consequently of the inter-receptor angle Δφ.

Some examples of the means of displacement 12 for generating a rotational displacement of the group G' are shown and described in the article by S. Viollet and N. Franceschini in the published article designated $A_2$: "Visual servo system based on a biologically-inspired scanning sensor", Sensor fusion and decentralized control in Robotics II, SPIE vol. 3839, pp. 144-155, 1999. In this article, however, the vibrational law is supposed to be exclusively periodic and follows a particular waveform.

A particularly noteworthy aspect of the device for measuring the angular position according to the invention, is that when the device is implemented as a visual sensor for fixation and/or tracking of a target with a contrasting edge, for example on board of an aerial robot, the natural vibrations caused by the displacement of the robot, or by the turbulences and/or by the robot's engine, will generate vibrations of the platform to which the support element 10 is firmly attached. The optical axes of the optical sensors $D_1$ and $D_2$ will therefore be subjected to the random vibrations of the platform. An advantage of the device according to the invention is its extreme lightness and robustness since additional actuators are not necessary.

A more detailed description of the demodulator 26, according to the present invention, will now be given with reference to FIGS. 11 to 13.

In the presence of noise, the relevant information contained in the signals $Ph_1'$ and $Ph_2'$, that is, the relative amplitude of these two signals, is extracted by demodulation. Several techniques of demodulation exist. Each technique requires adapted filters. In particular, three techniques of amplitude demodulation, adapted to three different situations, make it possible to extract the amplitude of the two signals in a robust way.

In the case considered above, the modulation is sinusoidal (FIG. 7A) and its frequency $f_a$ is a priori known. It is, however, not necessary to know the exact shape of the modulation signal $\Psi_{mod}$. If the modulation signal $\Psi_{mod}$ is not known or not measurable, an asynchronous demodulator can be used. The asynchronous demodulator can also be used when the device for detecting a contrasting edge is mounted on board of a system, such as a machine or a vehicle, of known mechanical resonance frequency. The natural vibration of the system at this frequency will generate signals on the optical sensors which can be extracted with this demodulator. The advantage of this solution is that it does not require any additional sensors such as a rate-gyro sensor to measure the actual vibration, nor any additional actuator to create the scanning process. The realization of the whole device is therefore simple and robust.

FIG. 11 shows an asynchronous demodulator 26. The front end of the asynchronous demodulator is a pair of selective filters 30 centred on the frequency $f_a$, which extract the differentiated signals, $Ph_1'$ and $Ph_2'$, originating from the first and second optical sensors $D_1$ and $D_2$, respectively. On each of the two channels, this filter 30 attenuates all signals whose frequencies are lower and higher than the frequency $f_a$, thus improving the signal-to-noise ratio of the signal at frequency $f_a$. Furthermore, it comprises a calculator 32 that generates a sine wave signal and a cosine wave signal at frequency $f_a$, which are multiplied by the filtered signals of the two optical sensors. This step results in the translation of the peak from frequency $f_a$ respectively to frequency 0 and $2f_a$ in the spectrum. After this step, the continuous component signal is similar to the amplitude of the signal modulated at the frequency $f_a$. However, this signal is noisy, because of the frequency $2f_a$ generated by this step.

The asynchronous demodulator comprises moreover means 34 for calculating the absolute value of the signal in order to relocate the frequency peak $2f_a$ towards $4f_a$. The absolute value is also necessary for the calculation of the output signal $Y_{out}$.

The asynchronous demodulator comprises a low-pass filter 36 to preserve only the DC part of the signal which is the reflection of the amplitude of the signal with the initial frequency $f_a$. This last step of low-pass filtering is more effective to remove the image frequency $2f_a$ due to the frequency doubling resulting from the calculation of the absolute value.

Then, the calculator 24 (FIG. 2) calculates the difference and the sum of the two demodulated signals, as well as the difference-to-sum ratio which represents the output signal of the device.

According to an alternative and with reference to FIG. 12, the demodulator 26 is a synchronous demodulator. Such a demodulator is used if the modulation signal $\Psi_{mod}$ is accessible, for example via the control signal of the actuator (e.g., a piezoelectric actuator or a galvanometer) that makes the optical axes of the optical sensors vibrate, or via a sensor (e.g., a rate gyro sensor) that measures the actual micro-vibration of the optical axes. Thus, the modulation signal $\Psi_{mod}$ can be unspecified and measured via a sensor, or preset via an actuator controlled with a predefined command law ($\Psi'_{mod}$).

The synchronous demodulator comprises a selective filter 40, a multiplier 42, a means 44 to calculate the absolute value of the signal and a low-pass filter 46, all components being comparable with those of the asynchronous demodulator of FIG. 11.

The selective filter 40 for $f_a$ is adapted to retain only frequencies present within the modulation signal $\Psi_{mod}$.

If the modulation is a sine wave signal at frequency $f_a$, the selective filter 40 tuned to the modulation frequency $f_a$ will allow the signals of the photodiodes $Ph_1'$ and $Ph_2'$ to be set in phase with the modulation signal $\Psi_{mod}$.

The synchronous demodulator comprises means 42 for calculating the demodulation, and is connected on the one hand to the selective filter 40 and on the other hand to means 44 for calculating the absolute value. The means 42 uses the sine wave signal $\Psi_{mod}$ directly without the need to differentiate or delay the modulation signal because of the intrinsic properties of the sine function.

The calculation carried out during synchronous demodulation is simpler than that carried out during the asynchronous demodulation. It is the most effective demodulation if the modulation signal ($\Psi_{mod}$ or $\Psi'_{mod}$) is known or can be estimated. The result of demodulation is optimal when the signals coming from the photodiodes $Ph_1'$ and $Ph_2'$ are in phase with the signal used for demodulation. This setting in phase can be done by delaying the modulation signal ($\Psi_{mod}$ or $\Psi'_{mod}$).

Furthermore, the use of a selective filter 40 tuned to the modulation frequency $f_a$ makes it possible to eliminate all the noise present in the spectrum around $f_a$. This filter is thus very efficient at the selected frequency but causes an important delay. An alternative is to use several selective filters to reject the identified noise (e.g., 100 Hz, 200 Hz).

Figure 13:
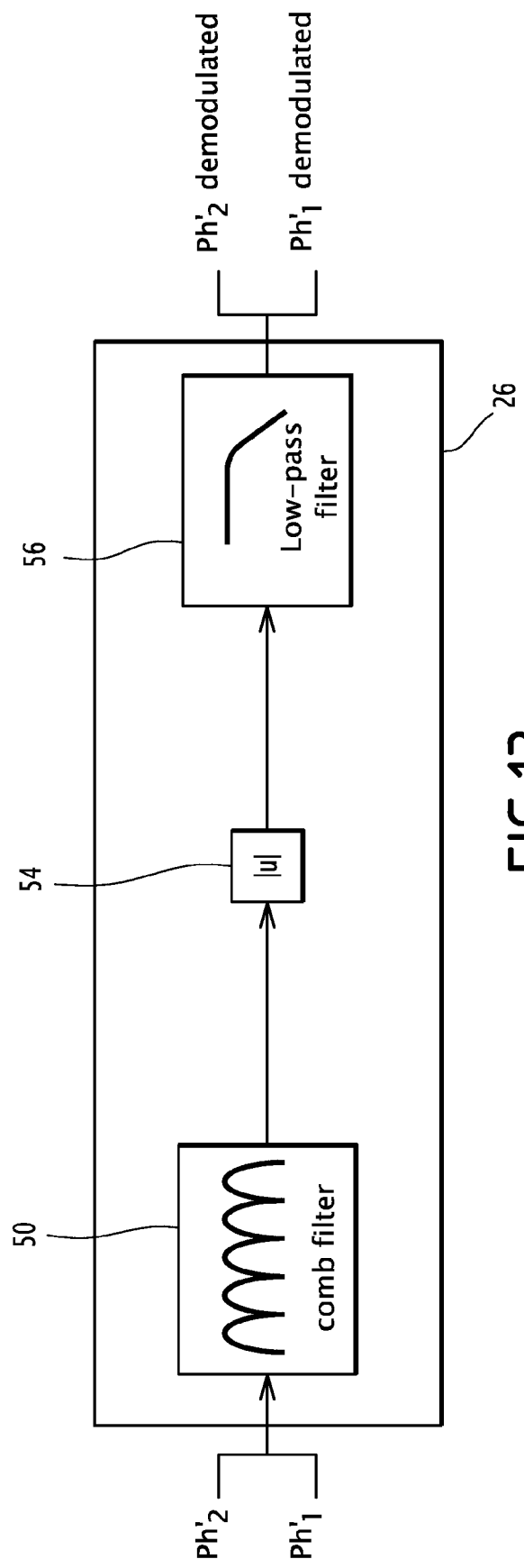

According to another embodiment and with reference to FIG. 13, the demodulator 26 is an envelope detector that detects the envelope of the two signals $Ph_1'(t)$ and $Ph_2'(t)$. Although this type of demodulator gives the least satisfying result in terms of noise rejection, it is the least constraining one of all three demodulators presented here.

The great advantage of the envelope detector over the asynchronous and synchronous demodulators is that it is able to extract the relevant information for the estimation of the angular position of the contrasting edge E without any knowledge of the vibration of the platform supporting the detection device. This characteristic allows for the realization of a particularly simple detection device where the group G' consisting of the lens and the optical sensors is mounted directly on the platform. The envelope detector will make it possible to use the visual information resulting from the vibration, irrespective of the vibrations of the platform and the origin of this vibration. The realization of an envelope detector is as simple as effective.

In reference to FIG. 13, the envelope detector comprises a comb filter 50 to remove all the multiple frequencies of 50 Hz, a means 54 for the calculation of the absolute value and a low-pass filter 56. The last two elements are both comparable with those of the asynchronous and synchronous demodulators. Means 54 for the calculation of the absolute value followed by the low-pass filter 56 extracts the envelope of the signals. The choice of the cut-off frequency of the low-pass filter 56 is a compromise between an acceptable noise level in the final measurement, and the dynamics of evolution of the measurement. For example, this cut-off frequency may be fixed at 10 Hz.

By way of example, a device for optical detection of a rectilinear contrasting edge according to the present invention, in which the rotational scanning of the inter-receptor angle $\Delta\phi$ of the optical sensors is obtained by vibrations of two photodiodes placed substantially in the focal plane of a lens with a focal distance of f=8.5 mm, gave the following results:

| Parameter | Device for measuring the angular position according to the invention |
| --- | --- |
| $\Delta\phi$ | 2.87° |
| $\Delta\rho$ | 3° |
| Range of detectable contrast | from 4.5% à 85% |
| Precision of angular localization | 0.01° |

The precision of angular localization of the contrasting edge is 0.01° which is amazingly greater (287 times greater) than the inter-receptor angle $\Delta\phi$. The device according to the invention, although being simple, is therefore characterized by an outstanding level of precision.

According to one embodiment, several devices for measuring the angular position can be arranged in a set of devices, in order to increase the total field of view of the detection device until it is rendered panoramic. The set of devices comprises at least one lens, a plurality of N optical sensors (N being an integer and N≥2) placed in the focal plane of the lens and (N−1) detection circuits as described before. Each pair of consecutive optical sensors is connected to a detection circuit to calculate a plurality of output signal $Y_{out(N)}(t)$. The output signal delivered by each detection circuit can thus be sampled for subsequent digital processing. The method as described before is applied to each pair of optical sensors to detect a contrasting edge or a bar.

The plurality of optical sensors can be placed in the focal plane of a single lens, the so-called "camera eye" configuration. Alternatively, one or several pairs of consecutive optical sensors can be placed in the focal plane of one of several lenses. Such a set of devices comprises a plurality of adjacent devices, each consisting of a lens and a plurality of optical sensors with different optical axes, the so-called "compound eye" configuration.

In the compound eye configuration, the devices are arranged substantially on a spherical or cylindrical surface surrounding a common centre. This common centre constitutes, for the set of devices, the optical centre of an inter-receptor angle $\Delta\phi$ which is the sum over all inter-receptor angles $\Delta\phi_i$ of each of the devices taken together.

Furthermore, this set of devices can be generalized for detecting a two-dimensional target comprising at least two contrasting edges, substantially rectilinear and orthogonal.

In the following example the number of optical sensors is limited to three, $D_1$, $D_2$ and $D_3$, in order to facilitate the description. The two pairs of optical sensors, $D_1$-$D_2$ and $D_2$-$D_3$, are arranged in two directions substantially orthogonal H and V. Each pair of optical sensors is placed in the focal plane of its own lens or all the optical sensors are placed in the focal plane of a single lens. Each lens and each optical sensor are arranged substantially on a spherical or cylindrical surface surrounding at least one common centre. A first centre constitutes the optical centre of an inter-receptor angle $\Delta\phi_H$, in the first direction, and a second centre, which can be identical to the first one, constitutes the optical centre of an inter-receptor angle $\Delta\phi_V$, in the second direction, substantially orthogonal to the first direction.

In the same manner as before, each pair of optical sensors is connected to a detection circuit to calculate two output signals $Y_{out(H)}(t)$ and $Y_{out}(V)(t)$, each output signal depending on the position of one contrasting edge of the target.

Finally, in a non-limiting embodiment, the plurality of optical sensors is arranged according to a matrix of optical sensors, each optical sensor constituting a pixel $D_{ij}$. The rectangular matrix of optical sensors made up in this way forms a two-dimensional retina.

A more detailed description of a particularly advantageous embodiment of the device for detecting a contrasting edge according to the present invention will now be given. In general, the direction in which vibration of the optical axes of the first and the second optical sensors $D_1$, $D_2$ is carried out can in principle be any direction. In a non-limiting embodiment, however, when this vibration is carried out with the aim of detecting a single contrasting edge E, this direction can advantageously be perpendicular to the given direction along which the contrasting edge E extends.

Such a method may be facilitated by orienting the vibration direction within a plane substantially corresponding to the focal plane of the lens L.

For this purpose and in accordance with a particular embodiment of the detection device for measuring the angular position according to the present invention, the detection device advantageously comprises a means for orienting an assembly $a_1$ formed by the support element, the lens L and the stationary reference mechanical support or an assembly $a_2$ formed by the support element, the group G of the first and second optical sensors $D_1$ and $D_2$ and the stationary reference mechanical support. Consequently, the direction of the vibrational displacement of the lens L or of the group G, and thus of the optical axes of the optical sensors, is oriented in the other direction transverse to said given direction of the substantially rectilinear luminance transition zone. Such means for orientation are described in patent document FR 2 869 494 (PCT: WO 2005/111536 A1).

The detection device for measuring the angular position according to the invention can be implemented in a steering aid system.

In the following, a steering aid system for the visual fixation and fine tracking of a target comprising at least one contrasting edge having a luminance transition zone and for controlling the speed of an aircraft shall be described.

The objective of the steering aid system is to allow an aircraft to fixate and track a target while controlling its angular speed, the yaw speed. The target comprises at least one contrasting edge corresponding to a transition in luminance.

The steering aid system comprises both a device for detecting the angular position of the contrasting edge according to the invention and a device for measuring the relative angular velocity between the line of sight of the aircraft and the contrasting edge of the target. The aim is to maintain the line of sight constantly on the contrasting edge E by controlling the angular speed of the aircraft according to both, the angular position and the angular velocity of the target relative to the contrasting edge.

A detailed description of the device for measuring the relative angular velocity and a corresponding method will be given in the following with reference to FIGS. 14 to 23.

Figure 14:
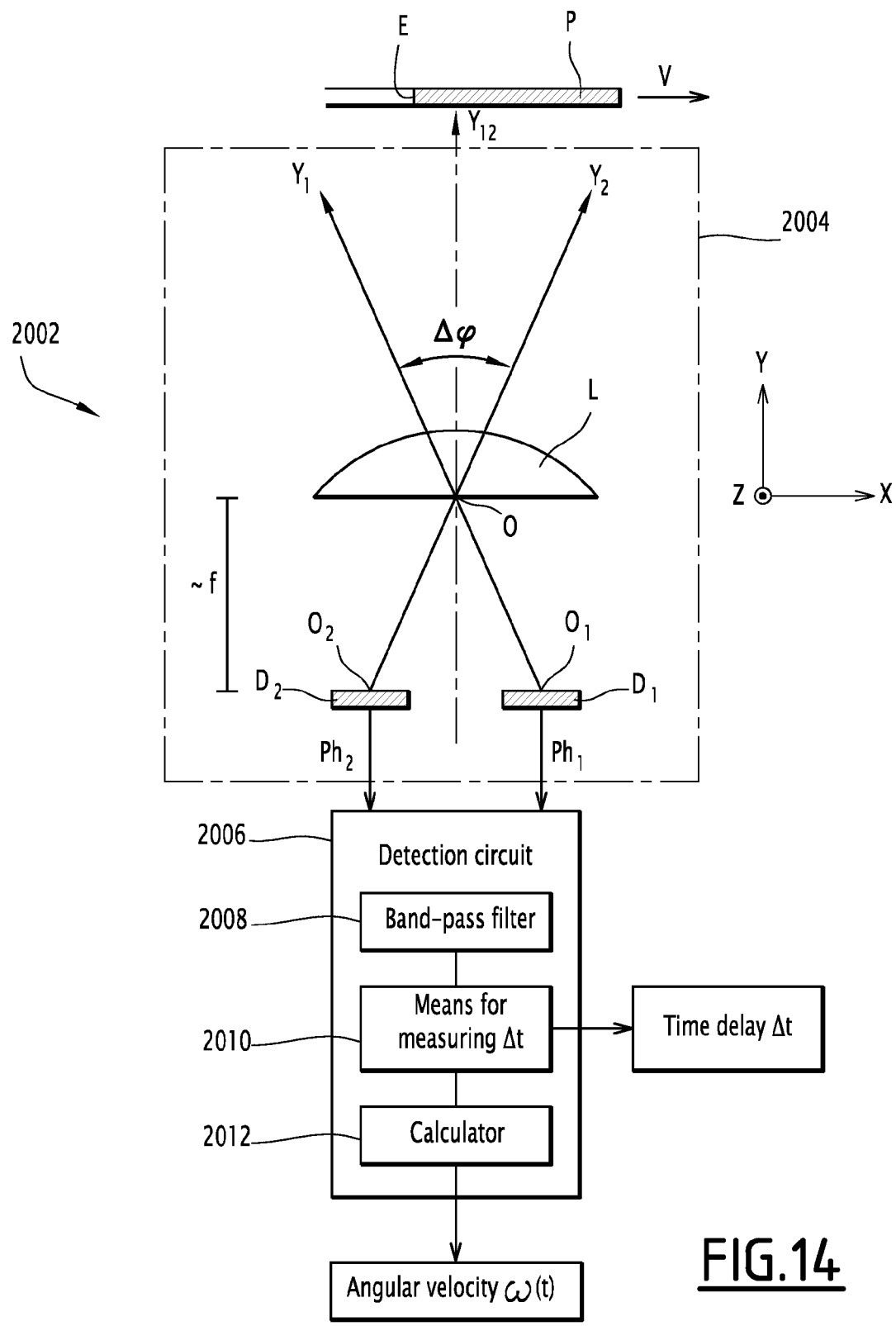
FIG. 14 is a schematic representation of the device for measuring an angular velocity of a luminance transition zone according to the invention.

Referring to FIG. 14, the luminance transition zone and, in particular, a contrasting edge E of an object P are rectilinear in a given direction, along the Z axis which is substantially orthogonal to the plane containing FIG. 14.

The device for measuring the angular velocity 2002 according to the invention comprises at least one optical device 2004 comprising a first and a second optical sensor $D_1$ and $D_2$, separated by an inter-receptor angle, denoted by $\Delta\phi$. The inter-receptor angle $\Delta\phi$ is the angle between the two optical axes $O_1Y_1$ and $O_2Y_2$ of the first and second optical sensors $D_1$ and $D_2$, respectively, with $O_1$ and $O_2$ being the centers of the first and second optical sensors, respectively.

The object P and its luminance transition zone are moving with a velocity denoted by V which is represented by an arrow in FIG. 14. The Object P is moving along the X axis which is orthogonal to the given direction along the Z axis. For example, object P is moving in the direction from the first to the second optical sensor. Consequently, luminance transition zone E is first detected by the first optical sensor $D_1$ and then by the second one $D_2$.

In a non-limiting embodiment, the optical device 2004 comprises a convex lens L which determines this inter-receptor angle $\Delta\phi$. The optical sensors $D_1$ and $D_2$ are placed substantially in the image focal plane of the lens L, so that the optical center O of the lens L is situated between the optical sensors $D_1$, $D_2$ and the luminance transition zone.

A reference direction is advantageously the direction $OY_{12}$ substantially corresponding to the average direction of the angle bisector between the optical axes $O_1Y_1$ and $O_2Y_2$ of the first and second optical sensors $D_1$, $D_2$.

In a preferred non-limiting embodiment, the first and the second optical sensors $D_1$ and $D_2$ are formed by photoelectric sensors such as photoelectric diodes, whose spectral sensitivity can be selected either in the spectral range of visible or even ultraviolet light or, alternatively, in the range of near of far infrared radiation, for example for nocturnal detection.

The wavelength of maximum sensitivity of the aforementioned photodiodes can thus be chosen in dependence of the application of the device for detecting a contrasting edge E according to the present invention.

Moreover, the device 2002 for measuring the angular velocity of the contrasting edge E according to the invention comprises a detection circuit 2006 in order to compute, on the basis of the signals delivered by the first and the second optical sensors $D_1$ and $D_2$, the angular velocity $\omega(t)$ of the luminance transition zone.

The detection circuit 2006 is connected to the first and second optical sensors and receives the signals delivered by the first and second optical sensors $D_1$ and $D_2$ which are denoted by $Ph_1(t)$ and $Ph_2(t)$, respectively.

The detection circuit 2006 comprises a band-pass filter 2008 connected to the optical sensors in order to compute the temporal derivative signals of $Ph_1$ and $Ph_2$, denoted by $Ph_1'$ and $Ph_2'$, of the first and second optical sensors, respectively.

Furthermore, the detection circuit 2006 comprises a means 2010 for measuring the time delay $\Delta t$ between the signals delivered by the first and the second optical sensors, the delay depending on the angular velocity of the luminance transition zone.

Optionally, the detection circuit 2006 can comprise a calculator 2012 for calculating, for example the angular velocity $\omega(t)$ (optic flow), or any mathematical function of the delay $\Delta t$ (calculated between the output signals of the optical sensors). The angular velocity $\omega(t)$ is the ratio of the inter-receptor angle $\Delta\phi$ to the delay $\Delta t$:

$$\omega(t) = \frac{\Delta\varphi}{\Delta t(t)}$$

Means 2010 for measuring the delay $\Delta t$ will now be described in detail with reference to FIG. 15. Means 2010 forms a feedback loop 2013 in order to determine the temporal evolution of the delay $\Delta t$ and therefore to update the delay with every cycle of the feedback loop.

The feedback loop 2013 for measuring the delay $\Delta t$ comprises at least means 2014 to delay the temporally filtered signal $Ph_1'$ delivered by the first optical sensor $D_1$, an estimator 2016 of the temporal error $\Delta t_{error}$ of the delay $\Delta t$ and a means 2018 to set the delay $\Delta t$ to a value $\Delta t_{init}$ calculated by an EMD when an error $Ph_{diff}$ which is initializing means 2018, is above a predetermined limit during a predetermined time.

The means 2010 for measuring the delay $\Delta t$ is shown in FIGS. 15 and 19. In this embodiment means 2010 comprises:
  means 2013 to update the estimated delay $\Delta t(t)$ at an instant $t_n$ between the temporally filtered signals delivered by the sampled first and second optical sensor output signals, starting from the estimated delay $\Delta t(t_n)$ and the temporal error $\Delta t_{error}(t)$ at the instant $t_n$;
  a means 2015 to compute an error $Ph_{diff}(t)$ at an instant $t_n$ between the temporally filtered signal delivered by the second sensor at the instant $t_n$ $Ph_2'(t_n)$ and the temporally filtered signal delivered by the first optical sensor at the instant $t_n$ delayed by the estimated delay $\Delta t(t)$ at the instant $t_n$: $Ph_1'(t_n - \Delta t(t_n))$;
  a derivative filter 2017 in order to compute the second-order temporal derivative function of the second optical sensor at the instant $t_n$: $Ph_2''(t_n)$; and
  a means 2019 to determine whether the estimated delay $\Delta t(t)$ at the instant $t_n$ should be increased or decreased in order to approach the real value of $\Delta t(t)$.

A more detailed description of the method 2100 for measuring the angular velocity of the luminance transition zone according to the present invention will now be given with reference to FIGS. 14 and 16 to 18.

When a luminance transition zone moves in front of the optical device 2004, along the X axis in the direction from the first optical sensor $D_1$ to the second one $D_2$, the sensors $D_1$ and $D_2$ convert the luminance coming from the object, and in particular from the luminance transition zone, in analogical signals (current or voltage). The temporal signals delivered by the first and second sensors $D_1$ and $D_2$ are denoted by $Ph_1(t)$ and $Ph_2(t)$, respectively.

The method 2100 according to the invention comprises a step 2102 of spatial filtering the signals delivered by the optical sensors $D_1$ and $D_2$.

Figure 16:
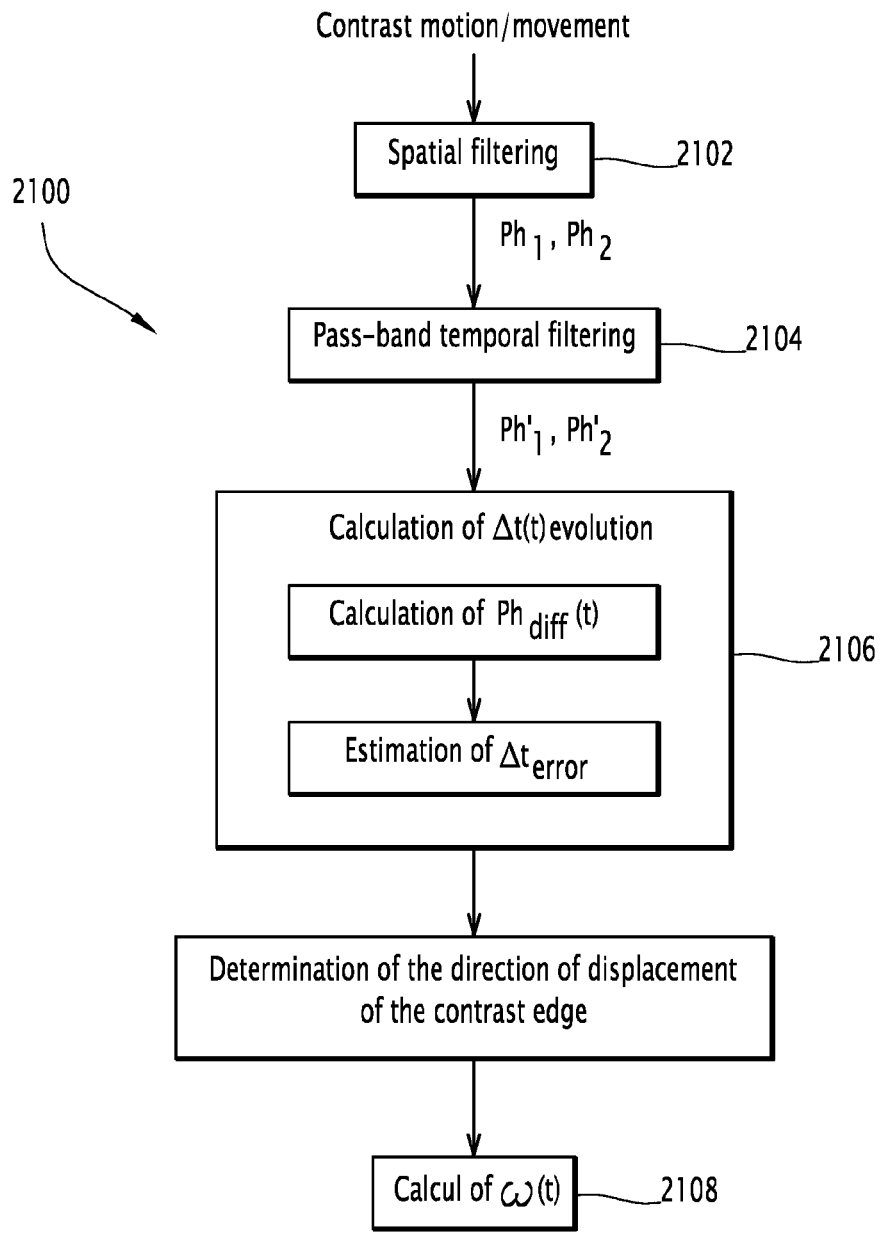
FIG. 16 is a schematic representation of the method for measuring the angular velocity of a luminance transition zone according to the invention.
Figure 17:
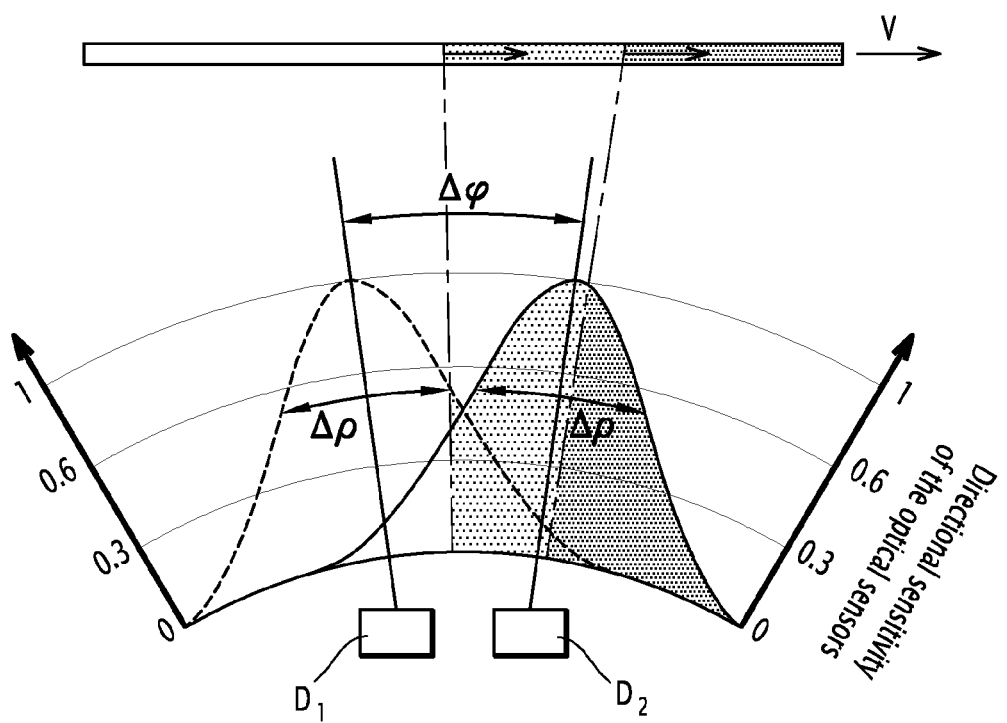
FIG. 17 is a schematic representation of the directional sensitivity of the optical sensors of the device for measuring the angular velocity according to the invention.

This spatial filtering 2102 is determined by the lens L (FIG. 16). Indeed, the lens confers to the two optical sensors a Gaussian sensitivity function, i.e. a Gaussian angular directivity, as shown in FIG. 17. These two directional sensitivity functions of the two optical sensors $D_1$ and $D_2$ overlap partially. The Gaussian shape is due to the convex lens defocusing the incoming light. The maximum sensitivity of each of the optical sensors $D_1$ and $D_2$ is along the optical axes $O_1Y_1$ and $O_2Y_2$ which delimit the inter-receptor angle $\Delta\phi$.

The first and second optical sensors $D_1$ and $D_2$ have a directional sensitivity, according to the angular position $\Psi$ of the light source:

$$s(\psi) = \frac{1}{\sigma\sqrt{2\pi}} e^{-\frac{\psi^2}{2\sigma^2}}$$

The parameter $\Delta\rho$ shown in FIG. 17 is the full width at half maximum (FWHM) of the sensitivity function and results directly from the variance $\sigma^2$ of the Gaussian function with $\Delta\rho = \sigma \times 2\sqrt{2\ln 2}$.

Typical optical characteristics of the optical device 2004 are: $\Delta\rho = 3°$ and $\Delta\phi = 2.87°$.

Placed in front of a contrasting edge, each optical sensor measures a value that is the integral of the angle $\psi$, of the sensitivity function $s(\psi)$ of the optical sensor multiplied by the luminance of the contrasting edge E.

Figure 18A:
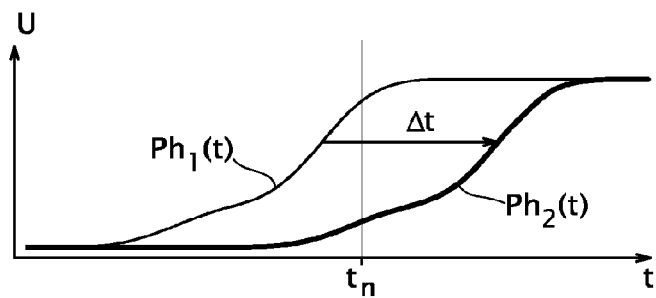
FIGS. 18A to 18D are a schematic representation of an example of the implementation of the method for measuring the angular velocity of a luminance transition zone according to the invention.

An example of the spatially filtered signals is shown in FIG. 18A. The signals $Ph_1(t)$ and $Ph_2(t)$ have the same shape but $Ph_2(t)$ is time delayed by $\Delta t$ compared to $Ph_1(t)$ due to the inter-receptor angle $\Delta\phi$ between the two optical axes of the optical sensors.

Figure 18B:
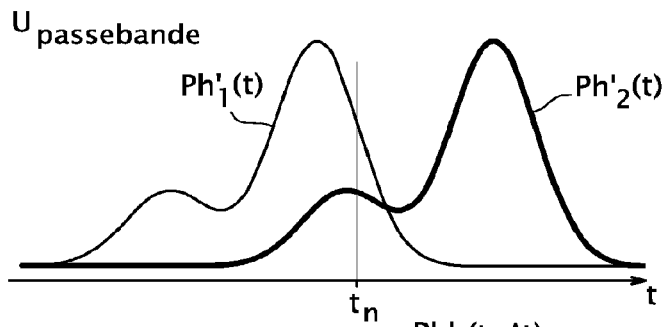

Then, in step 2104 (FIG. 16) a band-pass filter 2008, which is generally an analogical circuit, temporally filters the signals $Ph_1(t)$ and $Ph_2(t)$ delivered by the first and second optical sensors $D_1$, $D_2$ in order to compute the temporally derivative signals of the optical sensors, which are denoted by $Ph_1'(t)$ and $Ph_2'(t)$ (FIG. 18B). The band-pass filter 2008 comprises a high-pass filter and a low-pass filter.

The high-pass filter acts as a temporal differentiator of the signals delivered by the first and second optical sensors $D_1$ and $D_2$, especially in the frequency range from 0 to 30 Hz which contains the relevant information. The high-pass filter also cancels the DC component of the signals $Ph_1(t)$ and $Ph_2(t)$.

The low-pass filter attenuates the high frequency components of the luminance and reduces noise and interferences.

After temporal filtering 2104, the temporally differentiated signals are sampled, for example at a sampling frequency of 2 kHz.

In step 2106, means 2010 determines the delay $\Delta t$ between the signals $Ph_1(t)$ and $Ph_2(t)$ and in step 2108, the calculator 2012 calculates the angular velocity $\omega(t)$ according to the equation:

$$\omega(t) = \frac{\Delta\varphi}{\Delta t(t)}$$

or another function of the delay $\Delta t$.

Figure 18C:
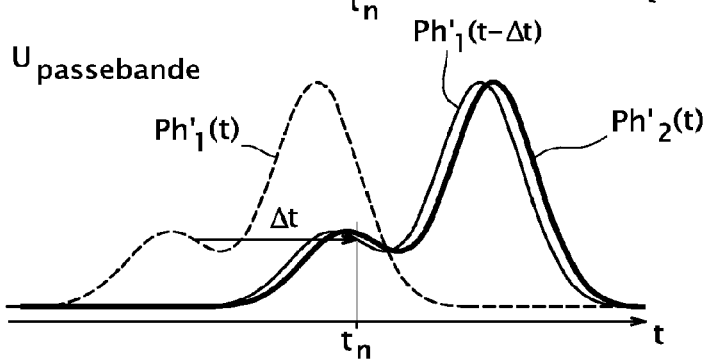
Figure 18D:
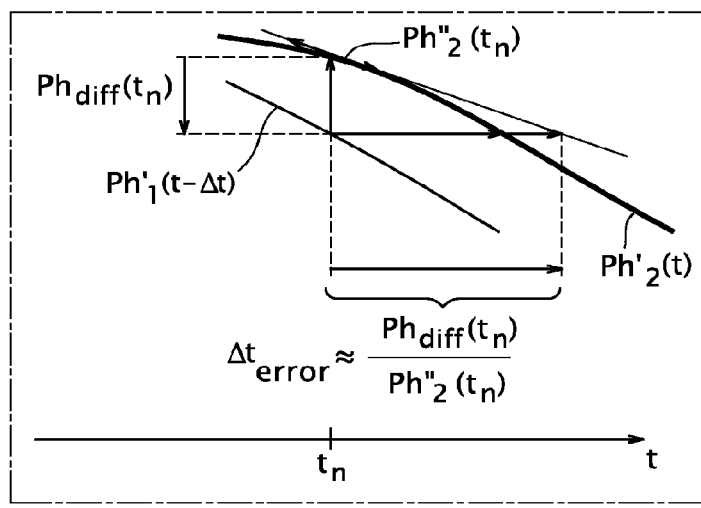

The determination 2106 of the delay $\Delta t$ will now be described in detail. The delay $\Delta t(t)$ is determined in a feedback loop The feedback loop comprises the steps of:

(a) estimating the delay $\Delta t(t)$ between the temporally filtered signals $Ph_1'(t)$ and $Ph_2'(t)$ at an instant $t_n$, this delay being denoted by $\Delta t(t_n)$;

(b) delaying the temporally filtered signal $Ph_1'(t)$ of the first optical sensor by the delay $\Delta t(t_n)$. The delayed signal is denoted by $Ph_1'(t-\Delta t(t_n))$. An example of this step is represented in FIGS. 18C and 18D, which is the enlarged view of the part shown in a box in FIG. 18C;

(c) calculating the error $Ph_{diff}(t)$ at the instant $t_n$ between the temporally filtered signal $Ph_2'(t)$ delivered by the second optical sensor at the instant $t_n$ and the temporally filtered signal $Ph_1'(t-\Delta t(t_n))$ delivered by the first optical sensor and delayed by the estimated delay $\Delta t(t_n)$ at the instant $t_n$:

$$Ph_{diff}(t_n) = Ph_1'(t_n - \Delta t(t_n)) - Ph_2'(t_n)$$

If the estimated delay $\Delta t(t_n)$ is correct, i.e. corresponds to the real delay $\Delta t$ at the instant $t_n$, then $Ph_{diff}(t_n)$ is zero. Otherwise $Ph_{diff}(t_n)$ is different from zero.

When the output of the feedback loop $\Delta t(t_n)$ is incorrect, the feedback loop takes a signal $\Delta t_{error}(t)$ as an error signal which will be integrated and added to the current value of $\Delta t(t)$ in order to correct $\Delta t$ so that $\Delta t$ converges toward the real value of $\Delta t(t)$ and that the error $Ph_{diff}(t)$ converges toward zero.

The determination of the error $\Delta t_{error}(t)$ shall now be considered in detail.

In FIG. 18D, the signals $Ph_2'(t)$ and $Ph_1'(t-\Delta t)$ have a negative slope at the instant $t_n$ ( $Ph_2''(t_n) < 0$ and $Ph_1''(t_n - \Delta t_n) < 0$). The error $Ph_{diff}(t_n)$ according to the equation above is also negative. As it can be seen from FIG. 18D, the estimated delay $\Delta t$ is too small. Consequently, $\Delta t$ has to be augmented by a positive value $\Delta t_{error}(t_n)$ in order to reduce $Ph_{diff}(t)$. It is important to note that in the case (not shown) that the signals $Ph_2'(t)$ and $Ph_1'(t-\Delta t)$ have a positive slope at the instant $t_n$, and that $Ph_1'(t-\Delta t)$ is larger than $Ph_2'(t)$, the error $Ph_{diff}(t_n)$ would be positive and the estimated delay $\Delta t$ too small. Consequently, the value $\Delta t, (t_n)$ needs to be positive in order to reduce $Ph_{diff}(t)$.

In the opposite case (not shown), that is when the estimated delay $\Delta t(t_n)$ is too large, $Ph_{diff}(t_n)$ is smaller than zero for signals with a positive slope at the instant $t_n$ and larger than zero for signals with a negative slope at the instant $t_n$. Consequently, the direction of evolution of the estimated delays $\Delta t(t)$ at the instant $t_n$ depends on the one hand on the sign of the slope of $Ph_2'(t)$ (or of $Ph_1'(t-\Delta t)$ at the instant $t_n$ (sign of $Ph_2''(t_n)$ or of $Ph_1''(t_n - \Delta t_n)$) and on the other hand on the error $Ph_{diff}(t)$ at the instant $t_n$.

In the case that the error $Ph_{diff}(t_n)$ is different from zero, the evolution of the delay $\Delta t(t)$ at the instant $t_n$ should comply with the correlation given in the following table:

| Ph"₂ \ Ph_diff | + | − |
|---|---|---|
| + | Δt ↗ | Δt ↘ |
| − | Δt ↘ | Δt ↗ |

The feedback loop comprises furthermore the steps of:

(d) filtering the filtered signal of the second optical sensor $Ph_2'(t)$ by a derivate filter in order to compute the second-order temporal derivative function $Ph_2''(t)$ of the signal of the second optical sensor at the instant $t_n$, denoted by $Ph_2''(t_n)$;

(e) estimating the temporal error $\Delta t_{error}(t_n)$ of the delay $\Delta t(t_n)$, on the basis of the error $Ph_{diff}(t_n)$ and the second-order temporal derivative function $Ph_2''(t_n)$ (or the signal $Ph_1''(t_n - \Delta t(t_n))$); and (f) estimating the evolution of $\Delta t(t)$ from the temporal error $\Delta t_{error}(t_n)$. Many alternatives exist. A first one consists in setting a fixed slope value, denoted by $\alpha$, of the evolution, and then using the sign of $\Delta t_{error}(t_n)$ to define the direction of evolution at each instant. The value of $\Delta t(t)$ is then updated according to:

$$\Delta t(t)=\Delta t_{init}+\int_{t_{init}}^{t_n}\alpha \times 2*(\text{sign}(\Delta t_{error}(t))-0.5)dt$$

wherein the sign function takes the value +1 for positive values of $\Delta t_{error}(t)$, and 0 for negative values. Other alternatives consist in defining a slope $\alpha$ proportional to the absolute value $\Delta t_{error}$. This means that $\alpha$ becomes a function of the error $\Delta t_{error}(t)$.

Moreover, the feedback loop can reinitialize the value of $\Delta t$ to a value $\Delta t_{init}$. This reinitialization occurs when the error $Ph_{diff}(t)$ between the delayed signal of the first optical sensor and the signal of the second optical sensor is important. The reinitialization of $\Delta t$ may be triggered when the error $Ph_{diff}(t)$ stays above a predetermined value during a predefined time.

The reinitialization value $\Delta t_{init}$ is the output of a classical Elementary Motion Detector (EMD) as described in the article "Bio-inspired optic flow circuits for the visual guidance of micro-air vehicles" by F. Ruffier, S. Viollet, S. Amic and N. Franceschini (IEEE Int. Symposium on Circuits and Systems ISCAS 2003, Bangkok, Thailand, pp. 846-849).

Now, four alternative methods, represented in FIGS. 19 to 22, will be described. They use different estimators 2016 of the delay.

FIG. 19 shows the first embodiment of the estimator 2016. The estimated delay $\Delta t(t)$ increases or decreases with respect to the delay $\Delta t(t_n)$ with constant slope in dependence of the sign of the product of the error $Ph_{diff}(t_n)$ and the second-order temporal derivative function $Ph_2''(t_n)$.

If the error $Ph_{diff}(t_n)$ has the same sign as the second-order temporal derivative function $Ph_2''(t_n)$, $\Delta t(t_n)$ is too small and $\Delta t(t)$ has to increase with slope $\epsilon$. If $Ph_{diff}(t_n)$ and $Ph_2''(t_n)$ have opposite signs, $\Delta t(t_n)$ is too large and $\Delta t(t)$ has to decrease with slope $\epsilon$.

A simplified expression determining the evolution of $\Delta t(t)$ is $$\Delta t(t)=\Delta t_{init}+\int_{t_{init}}^{t_n}\epsilon \times 2*(\text{sign}(Ph_{diff}(t))\oplus\text{sign}(Ph''_2(t))-0.5)dt$$

where $\epsilon$ is a predetermined value and $\oplus$ is the exclusive or operator (xor). The sign function takes the value +1 for positive values, and 0 for negative values. This method is extremely simple to implement as the functions $\oplus$ (xor) and sign are basic and belong to the functions that are most quickly carried out in a microcontroller.

However the speed of evolution of the delay depends on the slope of $+\epsilon$ or $-\epsilon$.

A second alternative of the estimator 2016 shown in FIG. 20, takes into account the values of the error $Ph_{diff}(t)$ and of the second-order temporal derivative function $Ph_2''(t)$. The temporal error can be expressed according to the following approximation (FIG. 18D):

$$\Delta t_{error}(t_n) \approx \frac{Ph_{diff}(t_n)}{Ph''_2(t_n)}$$

In practice, the signals are noisy, in particular $Ph_2''(t)$. Also, this relation for the evolution for $\Delta t$ used as such gives a disturbed result and in the worst case it cannot lead to the solution. So, the ratio is weighted/by a factor $\alpha$ chosen in the interval [0;1]:

$$\Delta t_{error}(t_n) = \alpha \times \frac{Ph_{diff}(t_n)}{Ph''_2(t_n)}$$

The smaller the factor $\alpha$, the smoother will be the convergence of the estimated delay $\Delta t$. However, a small value of $\alpha$ will decrease the speed of convergence of the estimated delay $\Delta t$, which complicates the estimation of the delay, provided that $\Delta t$ varies quickly (for example, during a rapid change of the angular speed rate).

In the two preceding alternative methods, the measurement noise on the estimation of $\Delta t$ is constant and does not depend on the value of $\Delta t$ itself. Thus, the computation of the angular velocity, which is reciprocally proportional to $\Delta t$, makes this noise not constant on the whole measurement range of $\omega(t)$. The measurement noise will be higher for high angular speed. The same reasoning can be applied for the speed of convergence of the method for computing $\Delta t$. This convergence speed or dynamic is constant over the whole range of the $\Delta t$ measurement. Thus, the dynamic on the resulting angular speed $\omega(t)$ depends on the angular speed itself i.e. the higher the angular speed, the faster the dynamic.

A third embodiment of the estimator 2016 shown in FIG. 21, takes into account the values of $\Delta t$ to estimate the error $\Delta t_{error}$. The corresponding method uses, instead of a factor, a function of the angular velocity $\omega(t)$ (or of its inverse $\Delta t$). This function, denoted by $\alpha(\Delta t(t))$, is chosen such as to get a constant noise on the computed angular velocity $\omega(t)$. The estimated value of an angular velocity variation will then have the same dynamic within the entire measurable range of angular velocity.

The update of the estimated delay is increased or decreased by the product of a function $\alpha(t)$ and the ratio of the error $Ph_{diff}(t)$ to the second-order temporal derivative function $Ph_2''(t)$. The function $\alpha(\Delta t(t))$ is proportional to the square of the estimated delay according to the equation:

$$\alpha_a(\Delta t(t))=\alpha_0 \times (\Delta t(t))^2$$

wherein $\alpha_0$ is a factor chosen in the interval [0;1]. In a fourth embodiment, the function $\alpha(\Delta t(t_n))$ is modulated by $|\cos(2\pi\Delta t/10e^{-3})|$:

$$\alpha_a(\Delta t(t_n))=\alpha_0 \times (\Delta t(t_n))^2 \times |\cos(2\pi\Delta t/10e^{-3})|$$

Figure 22:
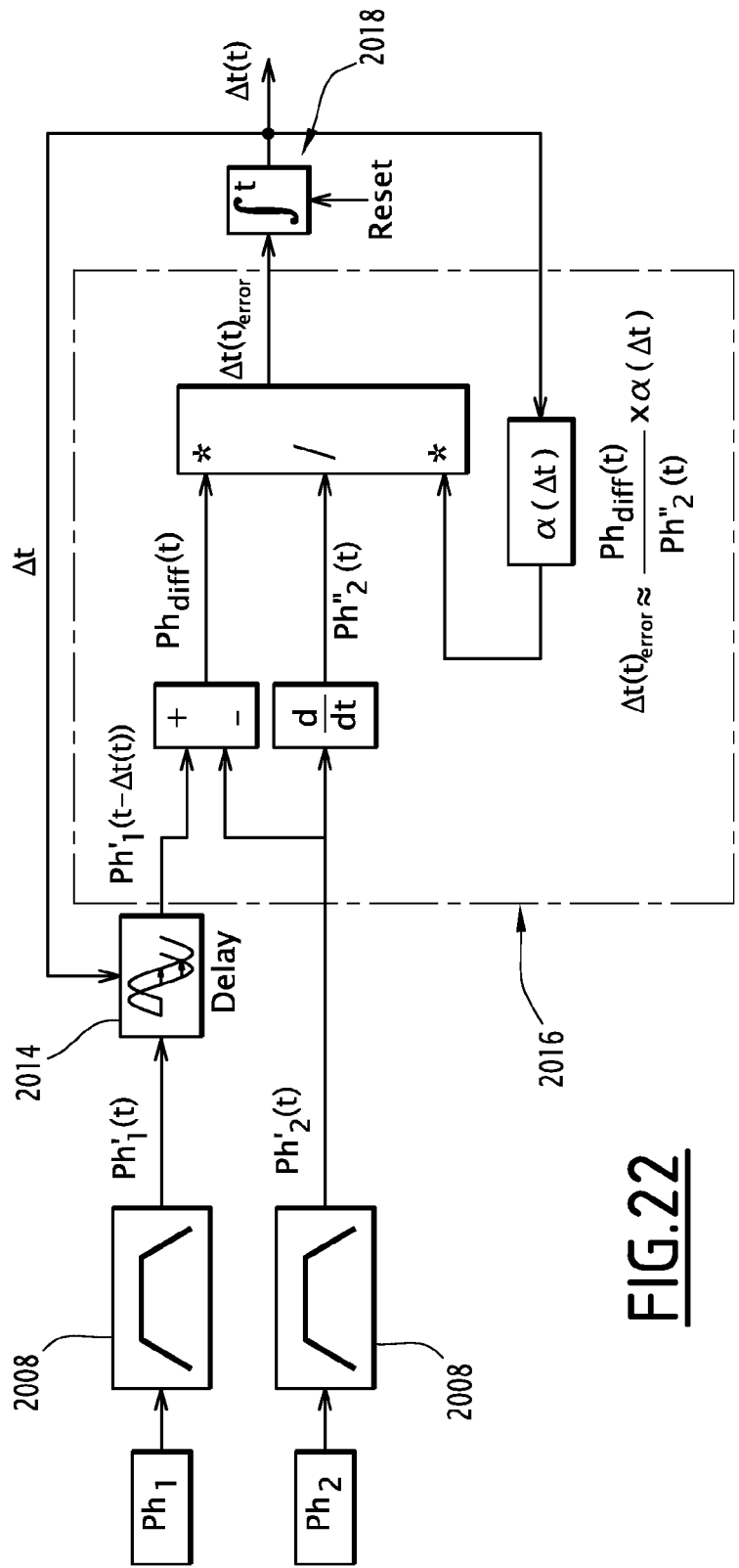

The corresponding estimator 2016 is shown in FIG. 22. The temporal error can be calculated according to the following equation:

$$\alpha_a(\Delta t(t)) = \alpha_0 \times (\Delta t(t))^2 \times \cos(2\pi \Delta t(t)/10e^{-3})$$

When the sensor is used in the presence of an artificial light (neon, 100 Hz), the artificial light is mainly filtered by the analogical filters of the step (a). However, when weak angular velocities are measured, the amplitude of the temporally derived function of the signals is low and the residue at 100 Hz, which does not contain relevant information, becomes a possible source of noise on the sensor output. This residue at 100 Hz has a weak influence when the delay $\Delta t$ is a multiple of 10 ms because the comparison of $Ph_2'$ and delayed $Ph_1'$ is carried out in phase with this noise at 100 Hz. Therefore, in this alternative method, $\alpha(\Delta t)$ has to be modulated by the function $|\cos(\Delta t * 2\pi F)|$ where F is the 100 Hz frequency.

Figure 23:
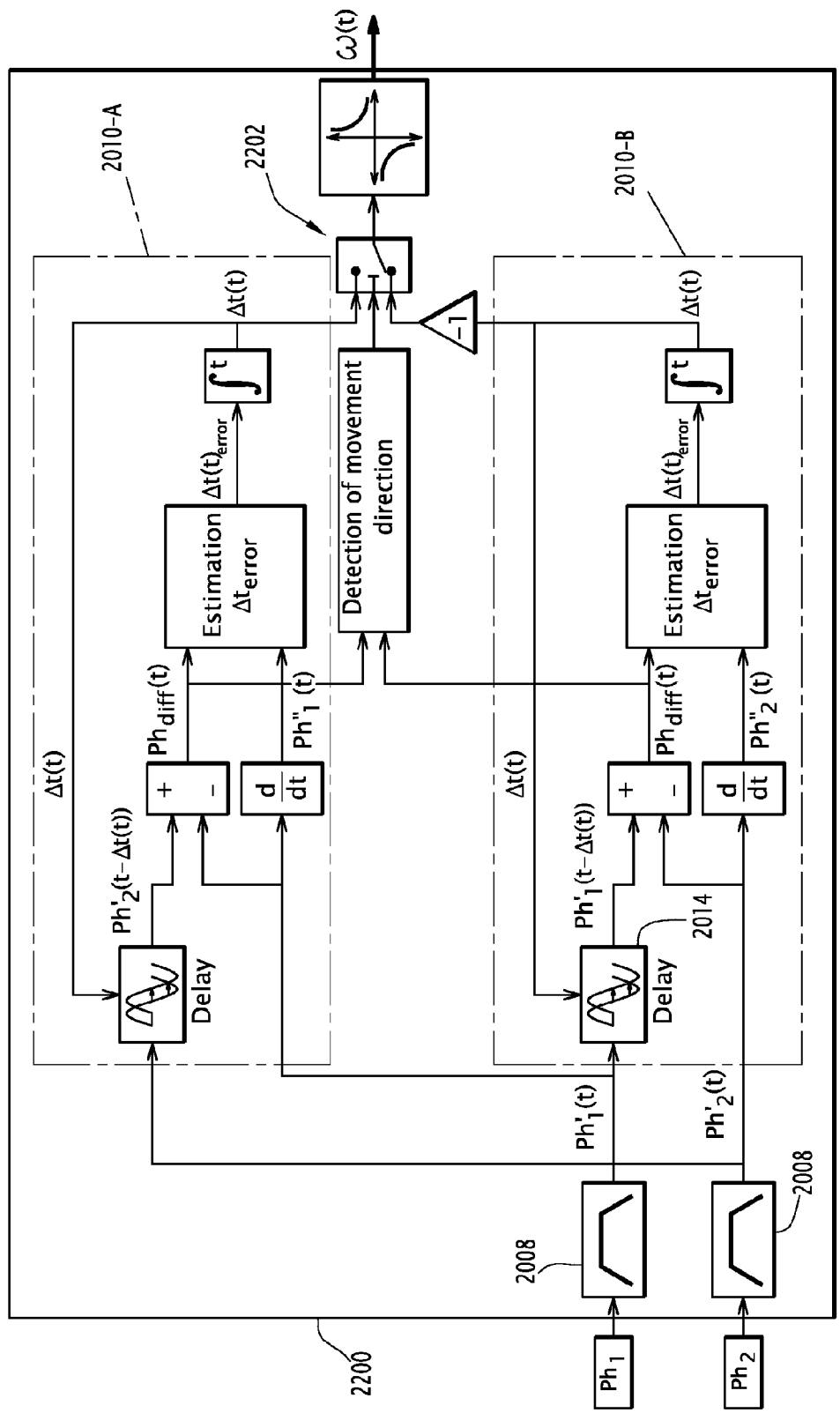
FIG. 23 is a schematic representation of another embodiment of the device for measuring an angular velocity which is bidirectional according to the invention.

In another embodiment of the device 2002 for measuring the angular velocity according to the invention and shown in FIG. 23, the device 2002 comprises a bidirectional detection circuit 2200 which comprises a means 2202 to detect the direction of the movement of the luminance transition zone E.

The bidirectional detection circuit 2200 comprises, as the aforementioned detection circuit 2006 (FIG. 14), at least a band-pass filter 2008 connected to the optical sensors in order to compute the derivative signals, denoted by $Ph_1'$ and $Ph_2'$, of the first and second optical sensors, and a calculator 2012 (not shown) for calculating the angular velocity $\omega(t)$.

Furthermore, the bidirectional detection circuit 2200 comprises a first and second means 2010-A and 2010-B for measuring the delay $\Delta t$ between the signals delivered by the first and second optical sensors, each of these means corresponding to means 2010 (FIG. 14) for measuring the delay $\Delta t$ according to the invention and as described before. Each of means 2010-A and 2010-B for measuring the delay is connected between the band-pass filter 2008 and the calculator 2012.

Means 2010-B delays the signal delivered by the first optical sensor $Ph_1'$ (step (b)) and uses the signal $Ph_2'$ as such. In contrast to means 2010-B, means 2010-A delays the signal delivered by the second optical sensor $Ph_2'$ and uses the signal $Ph_1'$ as such.

In the following, the same steps (c) to (f) as described before are executed. Means 2202 which detects the direction of the movement of the luminance transition zone is connected between means 2010-A and 2010-B on the one hand, and the calculator 2012 on the other hand.

Then, means 2202 compares the errors $Ph_{diff}(A)$ and $Ph_{diff}(B)$ calculated by the first and second means 2010-A and 2010-B, respectively, and uses the output of that means 2010-A or 2010-B for which $Ph_{diff}$ converges to zero.

Indeed, means 2202 selects first means 2010-B. In that case, means 2202 can deduce the angular velocity if the luminance transition zone moves from the first to the second optical sensor. And then means 2202 selects means 2010-A. In this case, means 2202 can deduce if the luminance transition zone moves from the second to the first optical sensor.

A device 2002 comprising such a bidirectional detection circuit 2200 is a bidirectional device because it works in the direction of the displacement of the luminance transition zone of the object, as well as in the opposite direction.

Measurements have shown that the dynamics of the detection device according to the invention, i.e. the capacity to measure an abrupt variation of the measured value, is as fast as the "classical" device.

The detection device for measuring an angular velocity according to the invention brings the following advantages.

According to one embodiment of the invention, the measurement of the angular velocity can be bidirectional. Experiments have shown that this device can be used in a wide range of luminosity. The measurement is not disturbed by a variation of luminosity or a sudden variation of the speed of the optical device relative to its visual environment (absence of transitory time). The angular velocity data are continuously updated. The device is simple and requires only few resources of calculation of a microcontroller. Its implementation is fast and measurements with the method are robust and more precise than by a classical method using thresholding.

According to an embodiment, several devices for measuring the angular velocity according to the invention can be combined forming a set of devices. Such a set of devices comprises at least one lens, a plurality of N optical sensors (N being an integer and N≥2) placed in the focal plane of the lens and a plurality of N−1 detection circuits as described hereinbefore. This embodiment has an increased total field of vision, which can even be panoramic, if necessary. Each pair of adjacent optical sensors is connected to a detection circuit to compute a plurality of output signals representing the angular velocity $\omega(t)$ within each inter-receptor angle of two adjacent optical sensors. The output signals delivered by the N−1 detection circuits can thus be sampled for subsequent digital processing. The method as described hereinbefore is applied to each pair of optical sensors to measure the angular velocity of a luminance transition zone.

The plurality of N optical sensors can be placed in the focal plane of a single lens, or each pair of consecutive sensors can be placed in the focal plane of one lens among a plurality of lenses.

Each lens and each optical sensor are arranged substantially on a spherical or cylindrical surface surrounding a common centre. This common centre constitutes, for the set of devices, the optical centre of an inter-receptor angle $\Delta\phi$ being the sum over all inter-receptor angles $\Delta\phi_i$ of each of the devices taken together.

Furthermore, this set of devices can be generalized for detecting a two-dimensional target comprising at least two contrasting edges (E), substantially rectilinear and orthogonal to each other.

In the following example, the number of optical sensors is limited to three, $D_1$, $D_2$ and $D_3$, in order to facilitate the description. The two pairs of optical sensors, $D_1$-$D_2$ and $D_2$-$D_3$, are arranged in two directions H and V substantially orthogonal to each other. Each pair of optical sensors is placed in the focal plane of one of two lenses or all the optical sensors are placed in the focal plane of a single lens. Each lens and each optical sensor are arranged substantially on a spherical or cylindrical surface surrounding at least one common centre. A first centre constitutes the optical centre of an inter-receptor angle $\Delta\phi_H$, in the first direction, and a second centre, which can be identical to the first one, constitutes the optical centre of an inter-receptor angle $\Delta\phi_V$, in the second direction, substantially orthogonal to the first one.

In the same manner as before, each pair of optical sensors is connected to a detection circuit to compute the angular velocities $\omega_H(t)$ and $\omega_V(t)$. Each output signal depends on the position of the contrasting edge (E) of the target.

Finally, in a non-limiting embodiment of the set of devices, the plurality of optical sensors is arranged according to a matrix of optical sensors, each optical sensor constituting a pixel $D_{ij}$. The rectangular matrix of optical sensors made up in this way forms a two-dimensional retina.

A more detailed description of a particularly advantageous embodiment of the device for measuring the angular velocity according to the present invention will now be given. In general, the reference direction $OY_{12}$ of the device can be any direction. In a non-limiting embodiment, however, this direction can advantageously be defined as perpendicular to the direction in which the luminance transition zone, and so the contrasting edge E, moves and to the direction in which it extends.

The corresponding method may be facilitated by orienting the reference direction $OY_{12}$ orthogonally to a plane substantially corresponding to the focal plane of the lens L.

For this purpose and in accordance with an embodiment of the detection device according to the present invention, the detection device advantageously comprises a means to orient the optical device 2004 and with it the reference direction $OY_{12}$ of the detection device in the direction transverse to said direction in which the substantially rectilinear luminance transition zone extends and to said direction in which the luminance transition zone moves.

Such means for orientation are described in patent document FR 2 869 494.

A steering aid system and its implementation are for example described in patent document FR 2 869 494 (PCT: WO 2005/111536A1). In the steering aid system according to the present invention, the detection device for detecting the angular position of the contrasting edge and the detection device for measuring the angular velocity of the luminance transition are replaced by the detection devices as described herein before.

The two devices, the one for measuring the angular position, called a position sensor, and the other for measuring the angular velocity, called a velocity sensor, can use the same optical sensors $D_1$, $D_2$ and the same band-pass filters of the detection circuits, which calculate the differentiated signals of the first and second optical sensors.

The methods for measuring the relative angular position and the relative angular velocity can be implemented either in series or in parallel. The position sensor vibrates. However, the vibration amplitude is too small to influence the measurement of the angular velocity.

The angular position sensor and the angular velocity sensor will give complementary visual information to the automatic flight control systems.

The steering aid system allows one to maintain the line of sight of the detection device constantly on the contrasting edge E, therefore leading to visual fixation of this contrasting edge by the detection device, when the contrasting edge is stationary, and to tracking when the contrasting edge happens to move. The aerial robot OSCAR II, equipped with a velocity sensor and a position sensor that uses the vibration inherent to the robot, was shown to be able to keep its heading locked onto a stationary edge. During a 2-minutes lasting experiment, the heading standard deviation of the robot was only $\sigma=0.15°$. With a moving target, this standard deviation increased only slightly ($\sigma=0.21°$).

In conclusion, this detection device of the position of a contrasting edge has the enormous advantage to work on the simple basis of a random microvibration. It is thus possible to use the natural vibrations of a mobile platform, instead of an extra actuator to make the optical axes of the two optical sensors vibrate.

The robot OSCAR II, the aerial robot presented in the article designated $A_1$, controls its yaw orientation by applying a differential command to its propellers. The detection device according to the present invention was shown to be able to operate by simply exploiting the natural vibrations of the robot, which were transmitted to the platform supporting the detection device. Due to the detection device, the robot is able to maintain its heading in the direction of a fixed contrasting edge, and to track this contrasting edge when it moves in the horizontal plane.

The invention claimed is:

1. A method for measuring the angular position of a contrasting edge of an object having a luminance transition zone which is substantially rectilinear in a given direction and separates two regions of different luminances, wherein the method comprises at least the functional steps of:
   carrying out, in a transverse direction different from the given direction, an amplitude modulation of the signals delivered by a first and a second optical sensor, by angular vibration of the optical axes of the first and second optical sensors, according to a given vibrational law, the vibration of the optical axes of the first and second optical sensors causing a vibration of the inter-receptor angle of the first and second optical sensors, the inter-receptor angle being delimited by the optical axes of the first and second optical sensors and containing the object with the luminance transition zone;
   calculating an output signal starting from the signals delivered by the first and the second optical sensors as a function of the angular position of the luminance transition zone, the output signal being independent of the vibrational law, and dependent on the angular position of the luminance transition zone relative to the mean optical axis of the device.

2. The method according to claim 1, wherein the output signal is the difference-to-sum ratio of the amplitudes of the temporally filtered signals delivered by the first and the second optical sensors.

3. The method according to claim 2, wherein the method comprises an additional step consisting of
   comparing the phases of the two temporally filtered signals, and
   determining whether the contrasting edge is a single contrasting edge or part of a thin bar, on the basis that two temporally filtered signals, measured for a single contrasting edge, are in phase and that two temporally filtered signals, measured for a thin bar, have opposite phases, a thin bar being the succession of two contrasting edges of opposite polarities.

4. The method according to claim 1, wherein the given direction and the transverse direction are orthogonal.

5. The method according, to claim 1, wherein the functional step of amplitude modulation consists in subjecting a lens having an optical center and being located between the stationary optical sensors and the luminance transition zone, or a group formed by the first and second optical sensors placed substantially in the image focal plane of the stationary lens to relative translational vibrations with respect to the luminance transition zone in said transverse direction.

6. The method according to claim 1, wherein in that the functional step of amplitude modulation consists in subjecting a group formed by the first optical sensor, the second optical sensor and the lens to relative rotation around an axis parallel to the given direction with respect to the luminance transition zone in said transverse direction.

7. The method according to claim 1, wherein characterized in that the functional step of amplitude modulation consists in maintaining a group consisting of the first and second optical sensors or a group consisting of the first and second optical sensors and a lens are stationary, while the luminance transition zone itself is vibrating.

8. The method according to claim 1, wherein in that the vibration of the optical axes of the first and second optical sensors in the transverse direction, is carried out by natural vibrations of a platform supporting the device.

9. The method according to claim 1, wherein the method comprises a step of demodulation of the signals delivered by the first and the second optical sensors before the step of calculating the output signal, the output signal being calculated starting from the demodulated signals.

10. A device for measuring the angular position of a contrasting edge of an object having a luminance transition zone which is substantially rectilinear in a given direction, the device comprising at least a first and a second optical sensor having an inter-receptor angle delimited by the optical axes of the first and second optical sensors, and the inter-receptor angle containing the object with the luminance transition zone, the device further comprising:
   a means for vibrational displacement of the optical axes of the first and second optical sensors in another direction transverse to the given direction, and
   a detection circuit comprising a means for calculating an output signal starting from the signals delivered by the first and the second optical sensors as a function of the angular position of the luminance transition zone, the output signal being independent of the vibrational law, and dependent on the angular position of the luminance transition zone.

11. The device according to claim 10, wherein comprises a lens having an optical center, the first and second optical sensors being placed substantially in the image focal plane of the lens and the average directions of observation of the first and second optical sensors corresponding substantially to two lines linking the centers of the first and second optical sensors and the optical center of the lens; and in that the means for vibrational displacement comprises, when said lens is stationary:
   a support element integral on the one hand, with a group formed by the first and second optical sensors and, on the other hand, with a stationary reference mechanical support;
   a means for applying, to said support element, a stress for controlling displacement to generate a translational displacement in the other direction of the group formed by the first and second optical sensors relative to said stationary reference mechanical support.

12. The device according to claim 11, wherein the device further comprises a means for orienting an assembly formed by the support element, the lens and the stationary reference mechanical support or an assembly formed by the support element, the group of the first and second optical sensors, and the stationary reference mechanical support, in order to orient the direction of the vibrational displacement of the lens or of the group in this other direction transverse to said given direction of the substantially rectilinear luminance transition zone.

13. The device according to claim 10, wherein the device comprises a lens having an optical center O, the first and second optical sensors being placed substantially in the image focal plane of the lens and the average directions of observation of the first and second optical sensors corresponding substantially to two lines linking the centers of the first and second optical sensors and the optical center of the lens; and in that the means for vibrational displacement in the other direction comprises, when a group formed by the first and second optical sensors is stationary:
   a support element integral, on the one hand, with said lens and, on the other hand, with a stationary reference mechanical support;
   a means for applying, to said support element, a stress for controlling displacement to generate a translational displacement of the lens relative to said stationary reference mechanical support.

14. The device according to claim 10, wherein the device comprises a lens having an optical center, the first and second optical sensors being placed substantially in the image focal plane of the lens and the average directions of observation of the first and second optical sensors corresponding substantially to two lines linking the centers of the first and second optical sensors and the optical center of the lens; and in that the means for vibrational displacement in the other direction comprises:
   a support element integral, on the one hand, with a group formed by the lens and the first and second optical sensors and, on the other hand, with a stationary reference mechanical support;
   a means for applying, to said support element, a stress for controlling displacement to generate a rotational displacement, around an axis parallel to the other direction, of said group relative to said stationary reference mechanical support.

15. The device according to claim 10, wherein the given direction and the other direction transverse to the given direction are orthogonal.

16. The device according to claim 10, characterized in that the detection circuit comprises a demodulator for demodulating the signals delivered by the first and the second optical sensors.

17. A set of devices comprising at least one lens, at least three optical sensors and a plurality of detection circuits, each pair of two consecutive optical sensors being placed close to the focal plane of one lens and connected to one of the plurality of detection circuits; in that one device comprises at least a first and a second optical sensor having an inter-receptor angle delimited by the optical axes of the first and second optical sensors, and the inter-receptor angle containing the object with the luminance transition zone, the device further comprising:
   a means for vibrational displacement of the optical axes of the first and second optical sensors in another direction transverse to the given direction, and
   a detection circuit comprising a means for calculating an output signal starting from the signals delivered by the first and the second optical sensors as a function of the angular position of the luminance transition zone, the output signal being independent of the vibrational law, and dependent on the angular position of the luminance transition zone;
and in that each lens and each optical sensor are arranged substantially on a spherical, cylindrical or curved surface surrounding at least one local common centre, the at least one local common centre constituting the optical centre of an inter-receptor angle which is the sum over all inter-receptor angles of each of the devices taken together.

18. The set of devices according to claim 17, wherein the devices forming the set of devices are arranged in two directions substantially orthogonal.

19. A steering aid system for the visual fixation and fine tracking of a target, the target being an object comprising at least one contrasting edge having a luminance transition zone which is substantially rectilinear in a given direction and for controlling the angular speed of an aircraft, wherein the steering aid system comprises:
   a device for measuring the relative angular position of the contrasting edge of the target comprising at least a first and a second optical sensor having an inter-receptor angle delimited by the optical axes of the first and second optical sensors, and the inter-receptor angle containing the object with the luminance transition zone, the device further comprising:

- a means for vibrational displacement of the optical axes of the first and second optical sensors in another direction transverse to the given direction, and
- a detection circuit comprising a means for calculating an output signal starting from the signals delivered by the first and the second optical sensors as a function of the angular position of the luminance transition zone, the output signal being independent of the vibrational law, and dependent on the angular position of the luminance transition zone;
- a device for measuring a relative angular velocity of the contrasting edge of the target;
- a means to maintain the line of sight of the steering aid system constantly on the angular position of the contrasting edge; and
- a means to control an angular speed of the aircraft according to the angular position and angular velocity of the target.

20. A steering aid system for the visual fixation and fine tracking of a target, the target being an object comprising at least one contrasting edge having a luminance transition zone which is substantially rectilinear in a given direction and for controlling the angular speed of an aircraft, wherein the steering aid system comprises:

- a set of devices comprising at least one lens, at least three optical sensors and a plurality of detection circuits, each pair of two consecutive optical sensors being placed close to the focal plane of one lens and connected to one of the plurality of detection circuits; in that one device comprises at least a first and a second optical sensor having an inter-receptor angle delimited by the optical axes of the first and second optical sensors, and the inter-receptor angle containing the object with the luminance transition zone, the device further comprising:
  - a means for vibrational displacement of the optical axes of the first and second optical sensors in another direction transverse to the given direction, and
  - a detection circuit comprising a means for calculating an output signal starting from the signals delivered by the first and the second optical sensors as a function of the angular position of the luminance transition zone, the output signal being independent of the vibrational law, and dependent on the angular position of the luminance transition zone;
  - and in that each lens and each optical sensor are arranged substantially on a spherical, cylindrical or curved surface surrounding at least one local common centre, the at least one local common centre constituting the optical centre of an inter-receptor angle which is the sum over all inter-receptor angles of each of the devices taken together;
- a device for measuring a relative angular velocity of the contrasting edge of the target;
- a means to maintain the line of sight of the steering aid system constantly on the angular position of the contrasting edge; and
- a means to control an angular speed of the aircraft according to the angular position and angular velocity of the target.

* * * * *